United States Patent
Singh et al.

(10) Patent No.: US 11,582,266 B2
(45) Date of Patent: Feb. 14, 2023

(54) METHOD AND SYSTEM FOR PROTECTING PRIVACY OF USERS IN SESSION RECORDINGS

(71) Applicant: Citrix Systems, Inc., Ft. Lauderdale, FL (US)

(72) Inventors: Manbinder Pal Singh, Coral Springs, FL (US); Georgy Momchilov, Parkland, FL (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 0 days.

(21) Appl. No.: 16/780,445

(22) Filed: Feb. 3, 2020

(65) Prior Publication Data

US 2021/0243233 A1 Aug. 5, 2021

(51) Int. Cl.
| | |
|---|---|
| H04L 29/06 | (2006.01) |
| H04L 12/54 | (2022.01) |
| H04L 29/08 | (2006.01) |
| H04L 15/16 | (2006.01) |
| G06F 15/16 | (2006.01) |
| G06F 21/64 | (2013.01) |
| G06F 21/62 | (2013.01) |
| H04L 65/1066 | (2022.01) |
| G06F 3/048 | (2013.01) |

(Continued)

(52) U.S. Cl.
CPC ......... *H04L 65/1066* (2013.01); *G06F 3/048* (2013.01); *H04L 12/56* (2013.01); *H04L 63/0435* (2013.01); *H04L 67/142* (2013.01); *H04L 2012/5618* (2013.01)

(58) Field of Classification Search
CPC . H04L 65/1066; H04L 63/0435; H04L 12/56; H04L 67/142; H04L 2012/5618; G06F 3/048
USPC ........................................................ 709/227
See application file for complete search history.

(56) References Cited

U.S. PATENT DOCUMENTS

| | | | |
|---|---|---|---|
| 5,801,697 | A | 9/1998 | Parikh |
| 6,429,883 | B1 | 8/2002 | Plow |

(Continued)

FOREIGN PATENT DOCUMENTS

| | | |
|---|---|---|
| CN | 102938801 A | 2/2013 |
| CN | 103218568 A | 7/2013 |

(Continued)

OTHER PUBLICATIONS

U.S. Appl. No. 16/716,669, filed Dec. 17, 2019, Singh.

(Continued)

*Primary Examiner* — David R Lazaro
*Assistant Examiner* — Berhanu Shitayewoldetadik

(57) ABSTRACT

A computer system is provided. The computer system includes a memory and a processor. The processor is configured to scan user interface (UI) data representative of a plurality of UI controls; detect a portion of the UI data associated with private information, the portion corresponding to a UI control of the plurality of UI controls; record first session data comprising an obfuscated version of the UI control and unobfuscated versions of other UI controls of the plurality of UI controls; record second session data comprising an unobfuscated version of the UI control; encrypt the second session data to generate encrypted session data; and store the encrypted session data in association with the first session data.

14 Claims, 14 Drawing Sheets

(51) Int. Cl.
*H04L 9/40* (2022.01)
*H04L 67/142* (2022.01)
*H04L 12/70* (2013.01)

(56) References Cited

U.S. PATENT DOCUMENTS

| | | |
|---|---|---|
| 6,937,730 B1 | 8/2005 | Buxton |
| 7,729,480 B1 * | 6/2010 | Packingham ............ H04W 4/00 |
| | | 379/202.01 |
| 8,171,423 B2 | 5/2012 | Olsen |
| 8,219,766 B1 | 7/2012 | Orcutt |
| 8,578,504 B2 | 11/2013 | Brown et al. |
| 8,726,343 B1 | 5/2014 | Borzycki |
| 8,799,668 B2 | 8/2014 | Cheng |
| 8,826,169 B1 | 9/2014 | Yacoub |
| 8,914,892 B2 | 12/2014 | Karande et al. |
| 9,015,082 B1 | 4/2015 | Jaiswal |
| 9,082,136 B1 | 7/2015 | Hewinson |
| 9,137,232 B2 | 9/2015 | Eschbach et al. |
| 9,268,398 B2 * | 2/2016 | Tipirneni ................ G06F 3/048 |
| 9,466,266 B2 | 10/2016 | Hildreth et al. |
| 9,574,671 B1 | 2/2017 | Amberg |
| 9,626,528 B2 | 4/2017 | Butler |
| 9,680,836 B2 | 6/2017 | White |
| 9,691,027 B1 | 6/2017 | Sawant |
| 9,767,585 B1 | 9/2017 | Carter, Jr. |
| 9,898,619 B1 | 2/2018 | Hadsall |
| 9,977,909 B1 * | 5/2018 | Austin ................... G06F 1/1694 |
| 10,032,037 B1 | 7/2018 | Allen |
| 10,043,033 B1 * | 8/2018 | Hadsall ................. G06F 21/604 |
| 10,255,053 B2 * | 4/2019 | Giri ......................... G06F 21/51 |
| 10,305,683 B1 | 5/2019 | Ghafourifar et al. |
| 10,325,103 B1 | 6/2019 | Austin |
| 10,347,293 B1 | 7/2019 | Skinner |
| 10,430,350 B1 * | 10/2019 | Nimry .................. G06F 21/6218 |
| 10,438,010 B1 | 10/2019 | Goodsitt |
| 10,511,698 B1 | 12/2019 | Chen |
| 10,552,585 B2 | 2/2020 | Verthein et al. |
| 10,614,454 B1 | 4/2020 | Brooks, V |
| 10,664,615 B1 | 5/2020 | Schenkein |
| 10,686,824 B2 | 6/2020 | Petry et al. |
| 10,701,079 B1 | 6/2020 | Ledet |
| 10,853,019 B1 | 12/2020 | Schwabacher |
| 11,184,406 B1 * | 11/2021 | Shashank ............ H04L 67/1095 |
| 11,455,423 B2 | 9/2022 | Kochura |
| 2004/0193910 A1 | 9/2004 | Moles |
| 2004/0255137 A1 * | 12/2004 | Ying ................... H04L 63/0884 |
| | | 713/193 |
| 2005/0240533 A1 | 10/2005 | Cutter |
| 2005/0277428 A1 | 12/2005 | Brown |
| 2006/0075040 A1 | 4/2006 | Chmaytelli |
| 2006/0129948 A1 * | 6/2006 | Hamzy ................... G06F 21/84 |
| | | 715/790 |
| 2006/0277220 A1 | 12/2006 | Patrick |
| 2007/0005713 A1 | 1/2007 | LeVasseur |
| 2007/0103552 A1 | 5/2007 | Patel |
| 2008/0034373 A1 * | 2/2008 | Glynn ................. H04M 3/2218 |
| | | 719/312 |
| 2008/0103799 A1 | 5/2008 | Domenikos |
| 2008/0148067 A1 | 6/2008 | Sitrick |
| 2008/0226199 A1 * | 9/2008 | Breglio ................... G06F 3/048 |
| | | 382/311 |
| 2008/0266467 A1 | 10/2008 | Okamoto |
| 2008/0279369 A1 * | 11/2008 | Palmer .................. H04L 9/0662 |
| | | 380/28 |
| 2009/0147958 A1 * | 6/2009 | Calcaterra ........... H04L 9/0833 |
| | | 380/260 |
| 2009/0257591 A1 | 10/2009 | Mithal et al. |
| 2009/0259967 A1 | 10/2009 | Davidson |
| 2009/0262931 A1 | 10/2009 | Nakagata |
| 2010/0045570 A1 | 2/2010 | Takata |
| 2010/0049743 A1 * | 2/2010 | Schmidt ............. G06F 11/2294 |
| | | 715/810 |
| 2010/0110095 A1 | 5/2010 | Sekiguchi |
| 2010/0161644 A1 * | 6/2010 | Crim ................... G06F 16/2453 |
| | | 707/E17.014 |
| 2010/0205667 A1 | 8/2010 | Anderson |
| 2010/0251374 A1 | 9/2010 | Dill |
| 2010/0275267 A1 | 10/2010 | Walker |
| 2011/0029774 A1 * | 2/2011 | Zunke ................... H04L 9/3271 |
| | | 713/168 |
| 2011/0032913 A1 * | 2/2011 | Patil ...................... H04W 72/08 |
| | | 370/338 |
| 2011/0088086 A1 | 4/2011 | Swink |
| 2011/0161656 A1 | 6/2011 | Rao |
| 2011/0251992 A1 * | 10/2011 | Bethlehem ........... H04L 67/141 |
| | | 707/610 |
| 2011/0258195 A1 | 10/2011 | Welling |
| 2011/0302442 A1 * | 12/2011 | Garrett ................. H04N 21/482 |
| | | 713/400 |
| 2012/0005475 A1 | 1/2012 | Inagaki |
| 2012/0023571 A1 | 1/2012 | Spies |
| 2012/0098639 A1 | 4/2012 | Ijas |
| 2012/0110174 A1 | 5/2012 | Wootton |
| 2012/0198368 A1 * | 8/2012 | Bornheimer ............. G06F 8/38 |
| | | 715/763 |
| 2012/0226742 A1 * | 9/2012 | Momchilov ............ G06F 3/048 |
| | | 709/203 |
| 2012/0260307 A1 | 10/2012 | Sambamurthy |
| 2012/0303558 A1 | 11/2012 | Jaiswal |
| 2012/0323717 A1 * | 12/2012 | Kirsch ............... G06Q 20/3829 |
| | | 705/26.1 |
| 2013/0007895 A1 | 1/2013 | Brolley |
| 2013/0019186 A1 | 1/2013 | Lance |
| 2013/0054635 A1 * | 2/2013 | Phelps .................. H04L 67/146 |
| | | 707/769 |
| 2013/0117670 A1 | 5/2013 | Mahajan et al. |
| 2013/0145457 A1 * | 6/2013 | Papakipos ........... G06F 21/6245 |
| | | 726/19 |
| 2013/0162817 A1 | 6/2013 | Bernal |
| 2013/0172027 A1 | 7/2013 | Sturges et al. |
| 2013/0201534 A1 * | 8/2013 | Carlen ............... H04N 1/00482 |
| | | 358/450 |
| 2013/0298076 A1 | 11/2013 | Rice |
| 2013/0339744 A1 * | 12/2013 | Nagai ................... H04L 63/061 |
| | | 713/182 |
| 2013/0344966 A1 | 12/2013 | Mustafa |
| 2014/0053232 A1 | 2/2014 | Coles |
| 2014/0189055 A1 * | 7/2014 | Etchegoyen .......... H04L 67/148 |
| | | 709/217 |
| 2014/0195798 A1 * | 7/2014 | Brugger ................. H04L 63/101 |
| | | 713/154 |
| 2014/0201527 A1 | 7/2014 | Krivorot |
| 2014/0215356 A1 | 7/2014 | Brander et al. |
| 2014/0259184 A1 | 9/2014 | Hoyer |
| 2014/0268244 A1 | 9/2014 | Sheridan |
| 2014/0280509 A1 | 9/2014 | Merrells |
| 2014/0283127 A1 | 9/2014 | Chacko |
| 2014/0351955 A1 | 11/2014 | White |
| 2015/0058997 A1 | 2/2015 | Lee et al. |
| 2015/0074506 A1 | 3/2015 | Dunn |
| 2015/0074615 A1 | 3/2015 | Han |
| 2015/0089357 A1 | 3/2015 | Vandervort |
| 2015/0113666 A1 | 4/2015 | Buck |
| 2015/0149529 A1 | 5/2015 | Loader |
| 2015/0200922 A1 | 7/2015 | Eschbach et al. |
| 2015/0271206 A1 | 9/2015 | Schultz |
| 2015/0278534 A1 * | 10/2015 | Thiyagarajan .......... G06F 21/84 |
| | | 726/28 |
| 2015/0281446 A1 | 10/2015 | Milstein |
| 2015/0287279 A1 | 10/2015 | Nichols |
| 2015/0288633 A1 * | 10/2015 | Ogundokun ............. H04L 51/42 |
| | | 709/206 |
| 2015/0346959 A1 * | 12/2015 | Ruben ................... G06F 3/0488 |
| | | 715/738 |
| 2015/0350136 A1 * | 12/2015 | Flynn, III ........... G06F 3/04842 |
| | | 715/752 |
| 2016/0011731 A1 | 1/2016 | Pasquero |
| 2016/0050526 A1 | 2/2016 | Liu |
| 2016/0054911 A1 * | 2/2016 | Edwards ................. G06F 3/048 |
| | | 715/762 |

(56) References Cited

U.S. PATENT DOCUMENTS

| | | |
|---|---|---|
| 2016/0078247 A1 | 3/2016 | Tucker et al. |
| 2016/0092685 A1 | 3/2016 | Tse |
| 2016/0098414 A1* | 4/2016 | Edmonds ............... H04L 67/02 715/234 |
| 2016/0099935 A1* | 4/2016 | Luskin ................ H04L 63/0823 713/193 |
| 2016/0100046 A1 | 4/2016 | Meru |
| 2016/0112209 A1 | 4/2016 | Yoon et al. |
| 2016/0156638 A1 | 6/2016 | Somani |
| 2016/0179454 A1 | 6/2016 | Liu |
| 2016/0188883 A1 | 6/2016 | Wang et al. |
| 2016/0188973 A1 | 6/2016 | Ziaja et al. |
| 2016/0191442 A1 | 6/2016 | Penilla et al. |
| 2016/0255084 A1 | 9/2016 | White |
| 2016/0261735 A1 | 9/2016 | Candelore |
| 2016/0269440 A1 | 9/2016 | Hartman |
| 2016/0270648 A1 | 9/2016 | Freeman |
| 2016/0294823 A1 | 10/2016 | McKeithan, II |
| 2016/0307002 A1 | 10/2016 | Zha |
| 2016/0328522 A1* | 11/2016 | Howley ............... H04L 63/0861 |
| 2016/0378869 A1 | 12/2016 | Nittka |
| 2017/0004331 A1 | 1/2017 | Weldon |
| 2017/0032150 A1 | 2/2017 | Hamlin |
| 2017/0061409 A1* | 3/2017 | Morecki ............... G06Q 30/016 |
| 2017/0068829 A1 | 3/2017 | Shaw |
| 2017/0134645 A1 | 5/2017 | Kim |
| 2017/0187751 A1 | 6/2017 | Andrews |
| 2017/0249432 A1* | 8/2017 | Grantcharov ............ G06F 1/12 |
| 2017/0264506 A1* | 9/2017 | Singhal ................ H04L 43/028 |
| 2017/0323099 A1 | 11/2017 | Song |
| 2017/0351909 A1 | 12/2017 | Kaehler |
| 2017/0359717 A1* | 12/2017 | Adler ................... H04W 12/42 |
| 2017/0364595 A1* | 12/2017 | Desai .................. G06F 16/2465 |
| 2017/0372527 A1* | 12/2017 | Murali .................. G06T 19/20 |
| 2018/0014150 A1* | 1/2018 | Elias .................... G07C 9/28 |
| 2018/0053003 A1 | 2/2018 | Nair |
| 2018/0054414 A1 | 2/2018 | Levasseur |
| 2018/0071634 A1 | 3/2018 | Carvallo et al. |
| 2018/0082068 A1* | 3/2018 | Lancioni ................ G06F 21/84 |
| 2018/0122506 A1* | 5/2018 | Grantcharov .......... G16H 50/50 |
| 2018/0124027 A1* | 5/2018 | Venkiteswaran ... H04L 67/1027 |
| 2018/0136898 A1* | 5/2018 | Shi ....................... H04R 29/001 |
| 2018/0145835 A1* | 5/2018 | Barbour ............... H04L 63/062 |
| 2018/0150647 A1* | 5/2018 | Naqvi ................... H04L 9/321 |
| 2018/0164589 A1 | 6/2018 | Watanabe |
| 2018/0165427 A1* | 6/2018 | Verthein ............... H04L 51/046 |
| 2018/0183581 A1* | 6/2018 | Elbaz ...................... G09C 1/00 |
| 2018/0189461 A1 | 7/2018 | Ghafourifar |
| 2018/0189504 A1 | 7/2018 | Ghafourifar |
| 2018/0189505 A1 | 7/2018 | Ghafourifar |
| 2018/0191686 A1* | 7/2018 | Ghafourifar ............... H04L 9/14 |
| 2018/0191701 A1 | 7/2018 | Kong et al. |
| 2018/0225019 A1 | 8/2018 | Xie |
| 2018/0262480 A1 | 9/2018 | Doi et al. |
| 2018/0276393 A1* | 9/2018 | Allen ................... G06F 3/0482 |
| 2018/0285591 A1* | 10/2018 | Thayer ................ G06F 21/6254 |
| 2018/0285592 A1* | 10/2018 | Sharifi .................. G06F 21/35 |
| 2018/0321826 A1 | 11/2018 | Bereza |
| 2018/0336373 A1 | 11/2018 | Deenadayal |
| 2018/0337918 A1* | 11/2018 | Chang .................... H04L 63/08 |
| 2018/0343321 A1* | 11/2018 | Chang .................... H04L 67/63 |
| 2018/0351961 A1* | 12/2018 | Calcaterra ............. H04L 63/105 |
| 2019/0012646 A1* | 1/2019 | Seidl .................... G06Q 20/102 |
| 2019/0013646 A1 | 1/2019 | Tan |
| 2019/0019177 A1* | 1/2019 | Lee ..................... G06F 21/6218 |
| 2019/0042059 A1* | 2/2019 | Baer .................... G06F 3/0481 |
| 2019/0050592 A1 | 2/2019 | Grau |
| 2019/0068687 A1 | 2/2019 | Masi |
| 2019/0073490 A1 | 3/2019 | Agrawal et al. |
| 2019/0080072 A1* | 3/2019 | Van Os .................. G06F 3/016 |
| 2019/0102263 A1* | 4/2019 | Singh ................... G06F 11/1469 |
| 2019/0102574 A1* | 4/2019 | Roberts ............. G06Q 30/0631 |
| 2019/0147169 A1 | 5/2019 | Adams |
| 2019/0171794 A1 | 6/2019 | Dhruva et al. |
| 2019/0213102 A1* | 7/2019 | Raviv ................. G06F 11/0748 |
| 2019/0220609 A1 | 7/2019 | Ghazanfari |
| 2019/0266337 A1 | 8/2019 | Sengupta |
| 2019/0278940 A1 | 9/2019 | Huang |
| 2019/0278961 A1* | 9/2019 | Schrader .................. B07C 3/18 |
| 2019/0279344 A1 | 9/2019 | Duggal |
| 2019/0289419 A1 | 9/2019 | Eronen |
| 2019/0306132 A1* | 10/2019 | Le Van Gong ....... H04L 9/0891 |
| 2019/0327215 A1* | 10/2019 | Bastian ................ H04L 9/0825 |
| 2019/0349366 A1* | 11/2019 | Dewan .................. H04L 12/46 |
| 2019/0361572 A1* | 11/2019 | Webber .................. G06F 9/451 |
| 2019/0386971 A1* | 12/2019 | Venkiteswaran ..... H04L 67/146 |
| 2020/0004983 A1 | 1/2020 | Chen |
| 2020/0012793 A1* | 1/2020 | Avraham ............. G06F 21/6254 |
| 2020/0019729 A1* | 1/2020 | Shanmugam ........ G06F 16/258 |
| 2020/0026394 A1 | 1/2020 | Rodolico |
| 2020/0028836 A1* | 1/2020 | Gandhi ................ H04L 63/062 |
| 2020/0065514 A1 | 2/2020 | Keen |
| 2020/0074090 A1* | 3/2020 | Naqvi .................. G07G 1/0009 |
| 2020/0074109 A1* | 3/2020 | Pieniazek ........... G06F 21/6245 |
| 2020/0104539 A1 | 4/2020 | Liu |
| 2020/0106749 A1* | 4/2020 | Jain ....................... H04L 63/08 |
| 2020/0110301 A1 | 4/2020 | Harrold et al. |
| 2020/0134240 A1 | 4/2020 | Balakrishna |
| 2020/0151243 A1 | 5/2020 | Chauhan |
| 2020/0151348 A1 | 5/2020 | Chauhan |
| 2020/0153911 A1 | 5/2020 | Chauhan |
| 2020/0175209 A1 | 6/2020 | Yost |
| 2020/0175610 A1 | 6/2020 | Pikle |
| 2020/0193031 A1* | 6/2020 | Avraham ............. G06F 21/566 |
| 2020/0228561 A1* | 7/2020 | Petry ..................... G06F 21/53 |
| 2020/0310945 A1* | 10/2020 | Scoda ................... H04L 67/02 |
| 2020/0311304 A1 | 10/2020 | Parthasarathy |
| 2020/0320638 A1 | 10/2020 | Erickson et al. |
| 2020/0349271 A1 | 11/2020 | Binkley |
| 2020/0380146 A1* | 12/2020 | Dodor ................... G06F 16/21 |
| 2021/0019441 A1 | 1/2021 | Neves Creto |
| 2021/0021573 A1 | 1/2021 | Scotney |
| 2021/0049280 A1 | 2/2021 | Koshy |
| 2021/0051294 A1 | 2/2021 | Roedel et al. |
| 2021/0160290 A1 | 5/2021 | Brieskorn |
| 2021/0185520 A1 | 6/2021 | Hassan |
| 2021/0350033 A1 | 11/2021 | Kapinos |
| 2022/0020104 A1* | 1/2022 | Bishop ................ H04L 65/4025 |
| 2022/0021721 A1* | 1/2022 | Liu ........................ H04L 65/70 |
| 2022/0164400 A1 | 5/2022 | Holloway |
| 2022/0164472 A1 | 5/2022 | Cannon |
| 2022/0164589 A1 | 5/2022 | Upshinskii |

FOREIGN PATENT DOCUMENTS

| | | |
|---|---|---|
| CN | 104794405 A | 7/2015 |
| CN | 105162693 A | 12/2015 |
| CN | 106716436 A | 5/2017 |
| CN | 106933465 A | 7/2017 |
| CN | 108509169 A | 9/2018 |
| CN | 105976303 B | 3/2019 |
| CN | 110378145 A | 10/2019 |
| CN | 110998573 A | 4/2020 |
| CN | 111338744 A | 6/2020 |
| EP | 2874396 A1 | 5/2015 |
| EP | 3337210 A1 | 6/2018 |
| JP | 2011248762 A | 12/2011 |
| JP | 2012198658 A | 10/2012 |
| KR | 100837815 B1 | 6/2008 |
| KR | 20150066129 A | 6/2015 |
| WO | WO 2013/101084 A1 | 7/2013 |
| WO | WO-2015073666 A1 * | 5/2015 ....... G06F 17/30873 |
| WO | 2015120677 A1 | 8/2015 |
| WO | WO2016205241 A | 12/2016 |
| WO | WO-2018102286 A1 * | 6/2018 ........... G06F 16/901 |

OTHER PUBLICATIONS

U.S. Appl. No. 16/725,295, filed Dec. 23, 2019, Bhaskar S, et al.
U.S. Appl. No. 16/716,761, filed Dec. 17, 2019, Singh.
U.S. Appl. No. 16/835,928, filed Mar. 31, 2020, Singh.
U.S. Appl. No. 16/870,056, filed May 8, 2020, Jiang, et al.
U.S. Appl. No. 16/369,648, filed Mar. 29, 2019, Singh, et al.

(56) References Cited

OTHER PUBLICATIONS

U.S. Appl. No. 16/910,615, filed Jun. 24, 2020, Qiao, et al.
U.S. Appl. No. 17/034,118, filed Sep. 28, 2020, Wang, et al.
U.S. Appl. No. 16/185,724, filed Nov. 9, 2018, Chauhan.
U.S. Appl. No. 17/073,773, filed Oct. 19, 2020, Qian, et al.
European Search Report and Written Opinion dated Mar. 31, 2020 for EP Application No. 19207955.6; 9 Pages.
Text Mask: Hide Confidential Page Content—Chrome Web Store; Downloaded from https://chrome.google.com/webstore/detail/text-mask-hide-confidenti/icodoomkkkhijlceahdabhkgdelffail?hl=en; Dec. 13, 2018; 6 pages.
"IBM Researchers Develop Shield To Mask Sensitive On-Screen Info" Downloaded from https://www.firstpost.com/business/biztech/ibm-researchers-develop-shield-to-mask-sensitive-on-screen-info-1873185.html; Jul. 10, 2009; 11 pages.
Goldsteen, et al., "Application-screen Masking: A Hybrid Approach;" Downloaded from https://www.firstpost.com/business/biztech/ibm-researchers-develop-shield-to-mask-sensitive-on-screen-info-1873185.html; Jul. 2015; 10 Pages.
U.S. Non-Final Office Action dated Jun. 6, 2019 for U.S. Appl. No. 16/185,724; 11 Pages.
U.S. Final Office Action dated Oct. 23, 2019 for U.S. Appl. No. 16/185,724; 12 Pages.
U.S. Non-Final Office Action dated Mar. 24, 2020 for U.S. Appl. No. 16/185,724; 11 Pages.
U.S. Final Office Action dated Sep. 9, 2020 for U.S. Appl. No. 16/185,724; 11 Pages.
PCT International Search Report and Written Opinion dated Oct. 27, 2020 for International Application No. PCT/US2020/051150; 12 Pages.
U.S. Non-Final Office Action dated Apr. 30, 2021 for U.S. Appl. No. 16/369,648; 26 pages.
U.S. Final Office Action dated May 13, 2021 for U.S. Appl. No. 17/073,773; 14 pages.
PCT International Search Report and Written Opinion dated May 10, 2021 for International Application No. PCT/US2020/062770; 19 pages.
PCT International Search Report and Written Opinion dated Feb. 23, 2021 for International Application No. PCT/CN2020/091951; 9 pages.
PCT International Search Report and Written Opinion dated Feb. 16, 2021 for International Application No. PCT/US2020/061927; 13 pages.
U.S. Non-Final Office Action dated Mar. 4, 2021 for U.S. Appl. No. 17/073,773; 17 pages.
U.S. Non-Final Office Action dated Mar. 15, 2021 for U.S. Appl. No. 16/185,724; 14 pages.
PCT Invitation to Pay Additional Fees dated Mar. 16, 2021 for International Application No. PCT/US2020/062770; 12 pages.
U.S. Non-Final Office Action dated Apr. 13, 2021 for U.S. Appl. No. 16/716,669; 21 pages.
U.S. Non-Final Office Action dated Feb. 16, 2021 for U.S. Appl. No. 17/034,118; 15 pages.
Office Action (Non-Final Rejection) dated Mar. 7, 2022 for U.S. Appl. No. 16/716,761 (pp. 1-23).
PCT International Search Report and Written Opinion dated May 26, 2021 for International Application No. PCT/CN2020/111793; 9 pages.
PCT International Search Report and Written Opinion dated Jun. 3, 2021 for International Application No. PCT/CN2020/112315; 9 pages.

European Patent Office Communication pursuant to Article 94(3) EPC for App. No. EP19207955.6, dated Mar. 17, 2022, 5 pages.
Office Action (Non-Final Rejection) dated Mar. 30, 2022 for U.S. Appl. No. 16/185,724 (pp. 1-13).
Office Action (Final Rejection) dated May 31, 2022 for U.S. Appl. No. 16/716,669 (pp. 1-8).
Office Action (Non-Final Rejection) dated Jun. 8, 2022 for U.S. Appl. No. 16/725,295 (pp. 1-13).
Office Action (Non-Final Rejection) dated Jul. 8, 2022 for U.S. Appl. No. 16/910,615 (pp. 1-17).
Camera recognition with deep learning BY Eleni Athanasiadou, Zeno Geradts and Erwin Van Eijk pp. 9; (Year: 2018).
Deep learning for source camera identification on mobile devices BY David Freire-Obregon; Fabio Narducci; Silvio Barra; and Modesto Castrillon-Santana pp. 6; Available online Jan. 9, 2018.
Hover-Over Content for User Interfaces, IPCOM000236793D, May 15, 2014, 37 pages (Year: 2015).
International Preliminary Report on Patentability issued in App. No. PCT/US2020/051150, dated Jun. 30, 2022, 8 pages.
International Preliminary Report on Patentability issued in App. No. PCT/US2020/061927, dated Aug. 18, 2022, 8 pages.
Method for Monitoring Event Related To Position_. JP 2001356978 A (Machine Translation) Inventors: I Anson Colin; Hawkes Rycharde Jeffery; McDonnell James Thomas Edward; Wilcock Lawrence and Crouch Simon E pp. 14; Date Published: Dec. 12, 2001.
Office Action (Final Rejection) dated Aug. 11, 2022 for U.S. Appl. No. 16/716,761 (pp. 1-25).
Office Action (Non-Final Rejection) dated Aug. 18, 2022 for U.S. Appl. No. 16/835,928 (pp. 1-24).
Techniques for Position-Based Actions Using Light-Based Communication wo 2015148696 A1 (Machine Translation) Inventors: Aggarwal Anant; Breuer Christian; and Stout Barry pp. 14; Date Published: Oct. 1, 2015.
International Preliminary Report on Patentability issued in App No. PCT/US2020/062770, dated Oct. 13, 2022, 11 pages.
Office Action (Final Rejection) dated Oct. 25, 2022 for U.S. Appl. No. 16/910,615 (pp. 1-21).
Bickford et al., "Safe Internet Browsing using a Transparent Virtual Browser", 2015 IEEE 2nd International Conference on Cyber Security and Cloud Computing, pp. 423-432 (Year: 2015).
Examination Report dated Aug. 23, 2021 for European Application No. 19207955.6; 5 Pages.
Final Office Action dated Jul. 21, 2021 for U.S. Appl. No. 16/185,724; 14 Pages.
Forte, Andrea et al., "EyeDecrypt—Private Interaction in Plain Sight", https://citeseerx.ist.psu.edu/viewdoc/download?doi=10.1.1.380.8867&rep=rep1&type=pdf, pp. 1-14 (Year: 2014).
Moreira et al., "Strategies for minimizing the influence of the use of BYOD and Cloud in organizations: 4CM Model", IEEE 11CCC 2016 (Year: 2016).
Non-Final Office Action dated Jul. 29, 2021 for U.S. Appl. No. 16/870,056; 11 Pages.
Office Action (Final Rejection) dated Jan. 26, 2022 for U.S. Appl. No. 16/870,056 (pp. 1-10).
Office Action (Final Rejection) dated Aug. 30, 2021 for U.S. Appl. No. 16/716,669 (pp. 1-8).
Office Action (Non-Final Rejection) dated Dec. 21, 2021 for U.S. Appl. No. 16/716,669 (pp. 1-7).
PCT International Search Report and Written Opinion dated May 27, 2021 for International Application No. PCT/CN2020/112314; 9 pages.

* cited by examiner

METHOD AND SYSTEM FOR PROTECTING PRIVACY OF USERS IN SESSION RECORDINGS

BACKGROUND

Session recording tools enable users to record, store, and playback recordings of interactive computing sessions between a user and a computer system. Some session recording tools provide flexible policies that can automatically trigger session recordings where predefined criteria are met. Session recording tools allow administrative personnel to monitor and examine user activity and, therefore, support internal controls for regulatory compliance and security monitoring.

SUMMARY

In at least one example, a computer system is provided. The computer system includes a memory and at least one processor coupled to the memory and configured to scan user interface (UI) data representative of a plurality of UI controls; detect at least one portion of the UI data associated with private information, the at least one portion of UI data corresponding to at least one UI control of the plurality of UI controls; record first session data comprising an obfuscated version of the at least one UI control and unobfuscated versions of other UI controls of the plurality of UI controls; record second session data comprising an unobfuscated version of the at least one UI control; encrypt the second session data to generate encrypted session data; and store the encrypted session data in association with the first session data.

At least some examples of the computer system can include one or more of the following features. The at least one processor can include a plurality of processors. The plurality of processors can include one or more first processors and one or more second processors. The computer system can include a gateway. The gateway can include the one or more first processors. The one or more first processors can be configured to scan the UI data.

In the computer system, to detect the at least one portion can include to compare the at least one portion to a set of UI data associated with private information. The set of UI data can include one or more of application names, window titles, universal resource identifiers, portions of universal resource identifiers, hypertext markup language elements, and user interface automation elements. To detect the at least one portion can include to detect one or more portions of the UI data that correspond to one or more UI controls selectable to cause the at least one processor to render the at least one UI control via a user interface.

In the computer system, to record the first session data can include to record the unobfuscated versions of other UI controls and to omit recording of the at least one UI control. To record the first session data can include to record the unobfuscated versions of other UI controls and to record an unintelligible version of the at least one UI control.

In the computer system, the at least one processor can be further configured to generate a symmetric encryption key and to encrypt the second session data using the symmetric encryption key. The at least one processor can be further configured to store the symmetric encryption key in association with the encrypted session data. The at least one processor can be further configured to receive, from a session player, a request to review the first session data; and transmit, to the session player, the first session data. The at least one processor is further configured to receive, from the session player, a request to clarify the obfuscated version of the at least one UI control and transmit, to the session player, the encrypted session data and the symmetric encryption key.

The computer system can further include a user interface. The at least one processor can be further configured to decrypt, via execution of the session player, the encrypted session data with the symmetric encryption key to render the second session data via the user interface. The at least one processor can be further configured to transmit, to a notification agent in response to reception of the request to clarify, a request to authorize rendering of the second session data; and receive, from the notification agent, a response to the request to clarify including an indication that the request to clarify is granted. The notification agent can be associated with a designated user.

In at least one example, a method of protecting private information using a computer system is provided. The method includes acts of scanning user interface (UI) data representative of a plurality of UI controls; detecting at least one portion of the UI data associated with private information, the at least one portion of UI data corresponding to at least one UI control of the plurality of UI controls; recording first session data comprising an obfuscated version of the at least one UI control and unobfuscated versions of other UI controls of the plurality of UI controls; recording second session data comprising an unobfuscated version of the at least one UI control; encrypting the second session data to generate encrypted session data; and storing the encrypted session data in association with the first session data.

At least some examples of the method can include one or more of the following features. The act of detecting the at least one portion can include an act of detecting one or more portions of the UI data that correspond to one or more UI controls selectable to initiate rendering of the at least one UI control.

The method can further include acts of receiving a request to review the first session data; transmitting the first session data to a session player; receiving a request to clarify the obfuscated version of the at least one UI control; transmitting a request to authorize rendering of the second session data to a notification agent; receiving a response to the request to clarify including an indication that the request to clarify is granted; transmitting the encrypted session data and a symmetric encryption key to the session player; and decrypting the encrypted session data with the symmetric encryption key to render the second session data via a user interface.

In the method, the act of transmitting the request to authorize can include an act of transmitting the request to authorize to a notification agent associated with a user associated with the private information.

In at least one example, a non-transitory computer readable medium is provided. The non-transitory computer readable medium stores processor executable instructions to protect private information. The instructions comprising instructions to scan user interface (UI) data representative of a plurality of UI controls; detect at least one portion of the UI data associated with private information, the at least one portion of UI data corresponding to at least one UI control of the plurality of UI controls; record first session data comprising an obfuscated version of the at least one UI control and unobfuscated versions of other UI controls of the plurality of UI controls; record second session data comprising an unobfuscated version of the at least one UI control; encrypt the second session data to generate encrypted session data; and store the encrypted session data in association with the first session data.

At least some examples of the non-transitory computer readable medium can include one or more of the following features. The instructions can include instructions to receive a request to review the first session data; transmit the first session data to a session player; receive a request to clarify the obfuscated version of the at least one UI control; transmit a request to authorize rendering of the second session data to a notification agent associated with a user associated with the private information; receive a response to the request to clarify including an indication that the request to clarify is granted; transmit the encrypted session data and a symmetric encryption key to the session player; and decrypt the encrypted session data with the symmetric encryption key to render the second session data via a user interface.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
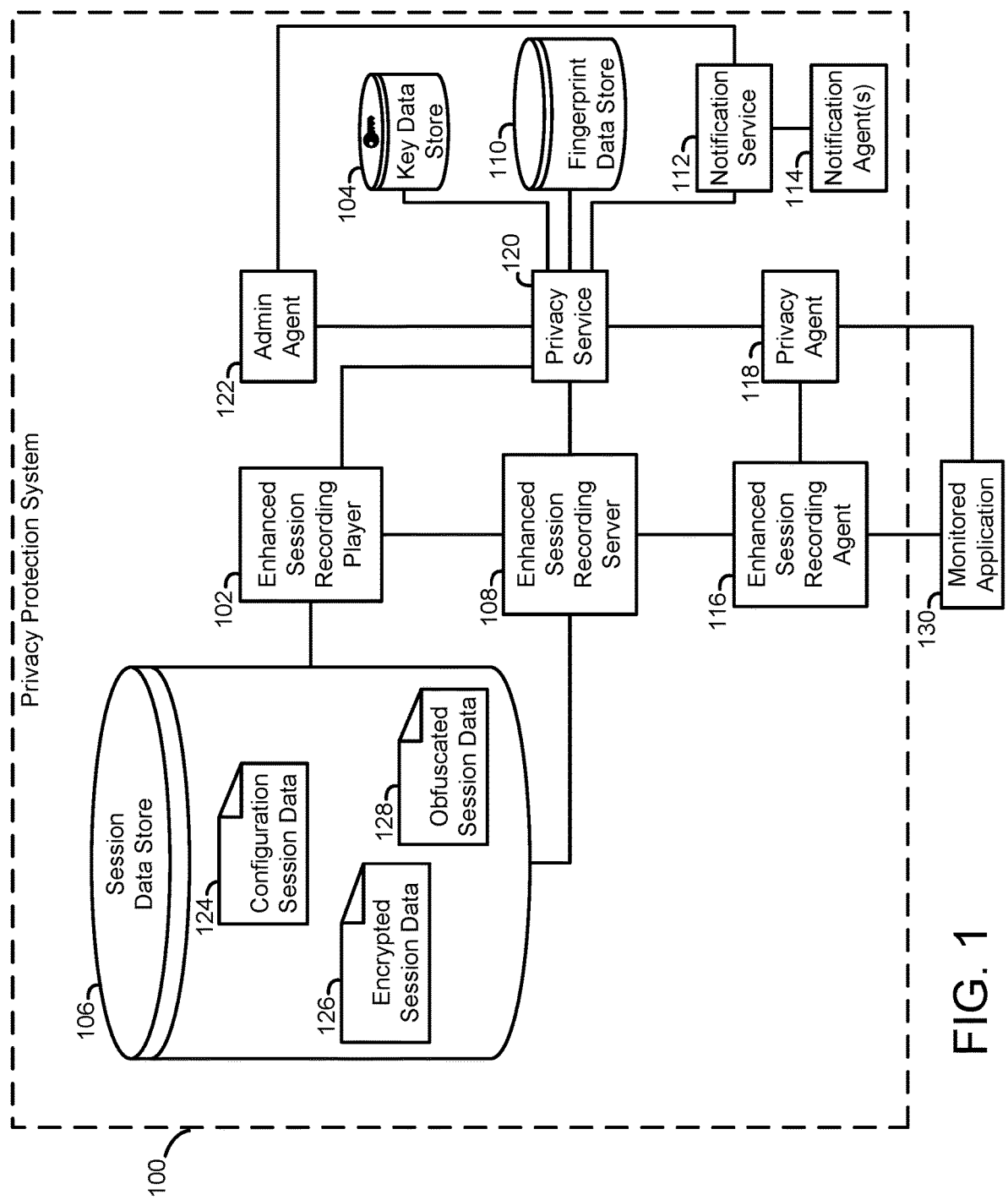
FIG. 1 is a block diagram of a privacy protection (PP) system in accordance with an example of the present disclosure.

As summarized above, various examples described herein are directed to systems and processes for protecting private information within session recordings. These systems and processes overcome technical difficulties in dealing with private data stored in session recordings. For instance, solutions that utilize optical character recognition (OCR) and data loss prevention (DLP) techniques can fail to identify private data and, therefore, fail to provide any protection for the private data. The inaccuracy of OCR/DLP techniques is exacerbated by an inability for information technology (IT) administrators to specify applications and/or portions of applications should not be recorded. Moreover, where OCR/DLP techniques do correctly identify and protect private data via obfuscation, the obfuscation performed can be difficult or impossible to reverse, which can cause tension with local, state, and federal laws that require the private data to be available for review in special circumstances.

Thus, to address these and other issues, at least some examples disclosed herein provide for privacy protection systems and processes. These systems and processes protect private information in computing session recordings by obfuscating (e.g., blurring) the private information by default. The obfuscated information is not available in a clear, intelligible form, even via administrative interfaces, unless a specific notification and/or approval process is satisfied. In some examples, this approval process can be executed to enable authorized personnel to satisfy legal and/or organizational policy requirements.

To protect private information from review as described above, in some examples, an enhanced, privacy-aware session recording agent records a computing session as an obfuscated stream of session data and a clear stream of session data and transmits both streams to an enhanced, privacy-aware session recording server. The enhanced session recording server generates one or more encryption key(s) (e.g., a symmetric or asymmetric), encrypts the clear stream using the encryption key(s) to generate an encrypted stream, and stores the obfuscated stream as obfuscated session data and the encrypted stream as encrypted session data.

Subsequently, an enhanced, privacy-aware session recording player renders the obfuscated session data by default during playback of the recorded computing session so as to protect the private information of the user of the computing session. Where the enhanced session recording server receives a request to clarify the obfuscated session data from the enhanced session recording player, the enhanced session recording player interoperates with a notification service to notify the user of the clarification request and/or request authorization from the user to clarify the obfuscated session data. The notification service may also request authorization from other designated users (e.g., administrative, executive and/or legal personnel). Where authorization to clarify the obfuscated session data is received, the encrypted session data is decrypted (by either the enhanced session recording player or the enhanced session recording server) and the enhanced session recording player renders the resulting clarified private information rather than, or in addition to, the obfuscated session data during playback. Where authorization to clarify is not received, the enhanced session recording player continues playback of the unadorned obfuscated session data.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Privacy Protection System

In some examples, a privacy protection system is configured to detect and protect private information generated by monitored applications. These monitored applications can include any process capable of displaying information within the user interface (UI) of a client device, such as locally executed applications, web applications, SaaS applications, and the like. FIG. 1 illustrates a logical architecture of a privacy protection system 100 in accordance with some examples. As shown in FIG. 1, the system 100 includes a session recording player 102 that is enhanced to be privacy-aware as described herein, a key data store 104, a session data store 106, a session recording server 108 that is enhanced to be privacy-aware as described herein, a fingerprint data store 110, a notification service 112, a notification agent 114, a session recording agent 116 that is enhanced to be privacy-aware as described herein, a privacy agent 118, a privacy service 120, and an administrative agent 122. The session data store 106 includes configuration session data 124, encrypted session data 126, and obfuscated session data 128.

In certain examples the system 100 protects private information as stored within recordings of interactive computing sessions. Each of these session recordings, which can include session data formatted as independent computing architecture (ICA) data, are descriptive of operations executed within a computing session. These operations can involve, for example, communications between one or more users and one or more client computers and/or communications between the one or more client computers and one or more server computers. Thus, a session recording can include frames of UI images rendered from UI data representative of the UI through the operations executed within the computing session. Each of the UI images can include one or more visible UI controls that each correspond to one or more elements of the UI data. In some examples, the UI data includes hypertext markup language (HTML) data, although other UI data can be processed in some examples.

In certain examples, the processes of the system 100 are configured to execute three high-level operations: system configuration, enhanced session recording, and protected session playback. A detailed description of each of these high-level operations, and the processes and data used in its implementation, follows.

System Configuration

To enable protection of private information, some examples of the system 100 are configured to identify the private information within a UI and/or to identify elements of the UI that facilitate access to, and are therefore associated with, the private information. In at least some of these examples, the system 100 is configured to compare changes detected within the UI to a set of fingerprints stored within the fingerprint data store 110. In these examples, each fingerprint of the set can specify one or more instances of UI data that indicate the presence of private information. As a fingerprint can include any element of UI data, a combination of such UI elements and values, and/or other information associated with UI data, the precision with which the system 100 can identify private information is highly configurable. For example, fingerprints designed for comparison to HTML documents can specify HTML elements, attributes, and values thereof. Alternatively or additionally, fingerprints designed for comparison with representations of UIs constructed from UI automation or hook messages can specify one or more values of objects and their properties or fields. The values specified within fingerprints can also include character strings (sometimes in the form of keywords, as discussed below), Boolean values, and numeric values, among others.

As fingerprints can be complex, their initial setup can be difficult. As such, in some examples, the administrative agent 122 and the privacy service 120 are collectively configured to create fingerprints specified by administrative personnel. In these examples, the administrative agent 122 is configured to implement a user interface that includes UI controls configured to receive user input specifying identifiers of high-level UI data, such as Uniform Resource Identifiers (URIs), application names, and window titles, to associate with private information. Further, in these examples, the administrative agent 122 is configured to transmit the identifiers to the privacy service 120. The privacy service 120, in turn, is configured to generate and store, in the fingerprint data store 110 fingerprints that include the high-level UI data.

To provide another approach to initial configuration of fingerprints having more precision, in certain examples, the privacy service 120, the session player 102, and the recording agent 116 are collectively configured to create fingerprints based on input received from administrative personnel. In these examples, the recording agent 116 is configured to implement a user interface that includes a UI control selectable to initiate a specialized recording mode in which the recording agent 116 records configuration session data 124 that includes session recording data and UI data. In these examples, when executing in the specialized recording mode, the recording agent 116 is configured to record session data descriptive of a UI rendered within a user-interactive computing session in which an administrator navigates UI controls that include private information. These UI controls can be part of a webpage or native application. Further, when executing in the specialized recording mode, the recording agent 116 is configured to record UI data representative of the UI controls rendered within the session data. This UI data can include HTML, which can be stored in document object models (DOMs), UI automation events descriptive of the UI controls, and/or other hooked UI events. The UI data can also include sets of coordinates that define the boundaries of the UI controls that correspond to the UI elements in the UI data. For instance, where the UI data is HTML, the recording agent 116 can be configured to call Element.getBoundingClientRect( ) for each UI element. This function returns viewport coordinates of a rectangular area corresponding to each UI element that encloses the UI element. Alternatively or additionally, where the UI data is based on UI automation events, examples of the recording agent 116 are configured to implement similar approaches that utilize UI automation application program interfaces (APIs) to identify areas corresponding to each UI element.

In certain examples, the recording agent 116 is configured to record the UI data as a part of the configuration session data 124 where the recording agent 116 detects changes to the UI rendered within the user-interactive computing session. The processes that the recording agent 116 is configured to execute to identify the changes to the UI depend on the type of UI data available. For instance, in some examples, the recording agent 116 is configured to receive notifications that precisely identify changes to the UI of a recorded application. In these examples, to identify the changes to the UI, the recording agent 116 is configured to simply parse the notifications and store data descriptive of the changes in memory for subsequent processing.

In other examples, the recording agent 116 is configured to construct and/or inspect a time sequence of representations of the UI of the recorded application. Each of the representations of the UI can be, for example, an instance of UI data. In these examples, the recording agent 116 is configured to identify the changes to the UI by contrasting consecutive representations in the time sequence and recording differences between the consecutive representations. These differences can include UI elements within a first representation of the UI that have no corresponding UI elements within a second representation of the UI. The differences can also include UI elements within the first representation that have corresponding UI elements within the second representation where the UI elements and the corresponding UI elements have differing attributes. These representations can include DOMs or representations constructed from UI automation or hook messages. Due to this change-based method of recording, the configuration session data 124 can consume less storage than data that stores all frames rendered within the UI and UI data corresponding to the frames, or even data that stores periodic snapshots of the UI and the UI data corresponding to the frames, as data produced by these techniques can include redundant data for static portions of the UI.

Returning to the approach to configure more precise fingerprints, in some examples, the privacy service 120 is configured to interoperate with the session player 102 to implement a user interface to create fingerprints based on the previously recorded configuration session data 124. In these examples, the session player 102 is configured to implement a user interface that includes UI controls selectable to initiate playback of the session data included within the configuration session data 124.

In certain examples, the session player 102 is configured to alter its user interface during playback to include a UI control selectable to initiate annotation of the UI being reviewed. For instance, in some examples, the session player 102 responses to selection of the UI control by freezing the playback of the session data to display a single frame and by altering the cursor to provide a visual indication that the annotation mode is active. In these examples, the session player 102 is further configured to receive input selecting a target UI control within the frame. This input can be, for example, a click upon the target UI control or the enclosure of the UI target UI control by a box, circle, or other shape drawn using the cursor. In some examples, the session player 102 is configured to receive additional input indicating that the target UI control includes private information, that the target UI control is selectable to navigate to private information, or that the target UI control is selectable to navigate away from private information.

In some examples, the session player 102 is configured to identify UI elements stored in the configuration session data 124 that correspond to the target UI controls identified during the annotation process described above. For instance, in certain examples, the session player 102 can be configured to map coordinates of target UI controls to the areas that define boundaries of the UI elements stored in the configuration session data 124. In these examples, the session player 102 is configured to identify a UI element that matches with and corresponds to a target UI control where at least some of the coordinates of the target UI control fall within the boundary area of the UI element. Further, in these examples, the session player 102 is configured to transmit requests to generate fingerprints including matched UI elements to the privacy service 120. These requests can include an identifier of the matched UI element, an identifier of the hierarchy to which the UI element belongs, and other attributes of the matched UI element.

In some examples, the privacy service 120 is configured to receive and process requests from the session player 102 to generate and store fingerprints of the matched UI elements. These fingerprints can include the UI element and a UI hierarchy to which the UI element belongs. For instance, where the representation of the UI is an HTML DOM, the privacy service 120 is configured to generate a fingerprint that includes a URI and window title under which the UI element falls. This fingerprint can include additional UI data, such as a type of the UI element, a value of the UI element, and/or or an identifier of a resource (e.g., an image/icon) associate with the UI element. The fingerprint can also include an indicator of whether the UI element contains private information and/or is selectable to render private information. Upon completion of generation of a fingerprint, the privacy service is configured to store the fingerprint in the fingerprint data store 110.

In some examples, the recording agent 116 is configured to record configuration session data 124 from computing sessions not involving administrative personnel using an unsupervised process. In these examples, the recording agent 116 is configured to monitor the UI rendered within the computing sessions for new UI elements (e.g., URIs, webpages, or application screens) that have not been processed by administrative personnel via the configuration processes described above. Further, in these examples, where the recording agent 116 detects a new UI element, the recording agent 116 stores configuration session data 124 descriptive of the new UI element and any UI element selected to initiate rendering of the new UI element. This configuration session data 124 can be processed by the session player 102 during a computing session with administrative personnel to generate new fingerprints using the processes described above.

Figure 2:
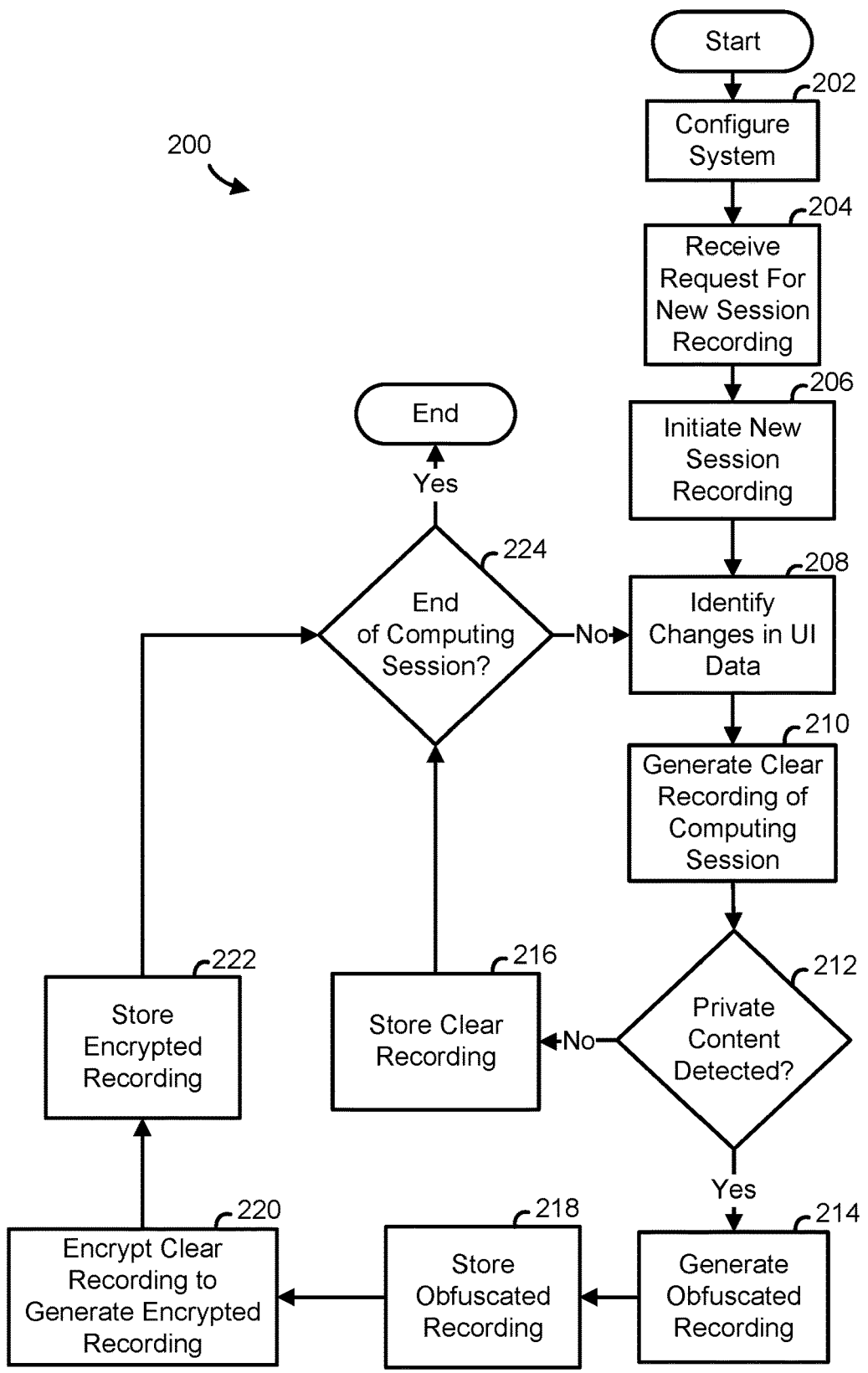
FIG. 2 is a flow diagram of an enhanced session recording process in accordance with an example of the present disclosure.

Additional features of configuration processes that the system 100 is configured to execute in some examples are described further below with reference to FIGS. 2-4.

Enhanced Session Recording

In some examples, the privacy agent 118 is configured to identify private information to be rendered by the monitored application 130 for protection by the recording agent 116, the session recording server 108, and the session player 102. In some examples, to identify private information, the privacy agent 118 is configured to scan various types of UI data that is renderable visually as one or more UI controls or that is descriptive of the rendering of the one or more UI controls. Thus, UI data that the privacy agent 118 is configured to scan can include, for example, hypertext markup language (HTML), UI automation messages, and/or hook messages. UI data in the form of hook messages and/or UI automation messages can be generated from UI related processes executed by a monitored application 130. UI data in the form of HTML can originate from a server application that serves the monitored application 130 and/or can originate from the monitored application 130, where the monitored application includes a web server. In some examples, the HTML can be transmitted to the privacy agent 118 from a server via a gateway process before the HTML is received by the monitored application 130. In other examples, the HTML can be scanned by the privacy agent 118 after it is received by the monitored application 130.

In some examples, the privacy agent 118 is configured to receive and process UI data including one or more of hook messages, automation messages, and HTML. In these examples, the privacy agent 118 can be configured to acquire the data using a variety of techniques. For instance, in some examples, the privacy agent 118 is configured to register, with sources of UI data (e.g., the monitored application 130 or a server to the monitored application 130), to receive UI data renderable by the monitored application 130 (e.g., HTML) and/or UI data including notifications (e.g., hook and/or automation messages) regarding changes to the UI of the monitored application 130.

In some examples, the privacy agent 118 is configured to identify private information within the UI data by first identifying changes to the UI and then analyzing those changes to determine whether the changes include private information. The processes that the privacy agent 118 is configured to execute to identify the changes to the UI depend on the type of UI data available. For instance, in some examples, the privacy agent 118 is configured to receive notifications that precisely identify changes to the UI of the monitored application 130. In these examples, to identify the changes to the UI, the privacy agent 118 is configured to simply parse the notifications and store data descriptive of the changes in memory for subsequent processing.

In other examples, the privacy agent 118 is configured to construct and/or inspect a time sequence of representations of the UI of the monitored application 130. Each of the representations of the UI can be, for example, an instance of UI data. In these examples, the privacy agent 118 is configured to identify the changes to the UI by contrasting consecutive representations in the time sequence and recording differences between the consecutive representations. These differences can include UI elements within a first representation of the UI that have no corresponding UI elements within a second representation of the UI. The differences can also include UI elements within the first representation that have corresponding UI elements within the second representation where the UI elements and the corresponding UI elements have differing attributes. These representations can include DOMs or representations constructed from UI automation or hook messages.

In some examples, the privacy agent 118 is configured to determine whether any identified changes to the UI include private information by comparing the identified changes to a set of fingerprints previously configured using the processes described above.

As explained above, fingerprints can specify UI elements and values that are present in forms that typically include private information. For instance, in one example, a fingerprint designed for use in detecting input forms associates a string value of "<form>" with URI elements and associates one or more string values such as "Name", "First Name", "Last Name", "Address", or other strings that indicate personally identifiable information with input elements of the <form>. In another example, a fingerprint designed for use in detecting login forms associates a string value of "<form>" with URI elements and associates one or more string values such as "Logon ID", "Employee ID", "Password", or other strings that indicate security credentials with input elements of the <form>. In another example, a fingerprint designed for use in detecting email forms associates a string value of "<form>" with URI elements and associates one or more string values such as "To:", "From:", "CC:", or other strings that indicate email recipients with input elements of the <form>. In these examples the privacy agent 118 is configured to receive the fingerprint in a message from the privacy service 120, parse the message to retrieve the fingerprint, and parse the fingerprint to retrieve the associations. In these examples, the privacy agent 118 is also configured to scan changes to the UI for URI and input elements that have the associated string values specified in the fingerprints. Further, in these examples, the privacy agent 118 is configured to tag the changes to the UI as including private information where the changes to the UI have matching URI and input elements with associated string values.

In another example, a fingerprint designed for use in detecting UI elements that are expressly tagged as having private information associates string values such as "private", "sensitive", "confidential", "personal", "PII", with all UI elements. In these examples, the privacy agent 118 is configured to tag UI elements included in the changes to the UI as including private information where the UI elements have attributes (e.g., labels, names, properties, fields, etc.) that match the associated string values.

In another example, a fingerprint designed for use in detecting keywords associates string values for the keywords (e.g., "profile", "contact", "contact.php", "/some/path/PeronalContactInfo.aspx", etc.) with all UI elements, which can include web addresses/URIs. In these examples, the privacy agent 118 is configured to tag UI elements included in the changes to the UI as including private information where the UI elements include string values that match the keywords.

In another example, a fingerprint designed for use in detecting UI elements served from particular websites associates string values storing names of popular social, financial, and other external websites (e.g., "Facebook", "CitiBank", etc.) with all URI elements and/or window title elements. In these examples, the privacy agent 118 is configured to tag URIs and/or windows included in the changes to the UI as including private information where the URIs and/or windows include string values that match the names.

In another example, a fingerprint designed for use in detecting UI elements that do not include private information, but that link to private information, associates string values storing URIs with URI elements. In these examples, the privacy agent 118 is configured to tag URIs included in the changes to the UI as including links to private information where the URIs include string values that match the string values in the fingerprint.

It should be noted that, in some examples described herein, values can match without being congruent. For instance, a string value of "contact" stored within a fingerprint can be a match for a string value of "contact.php" stored in the changes to the UI, in some examples. It should also be noted that UI elements identified within the changes to the UI as including private information, which may be referred to herein as "private UI elements" can range from single fields to entire windows or screens.

In some examples, the privacy agent 118 is configured to interoperate with the monitored application 130 to identify areas of UI controls that correspond to the private UI elements. For instance, where the monitored application 130 is a browser or a virtual workspace client that includes an embedded browser, the privacy agent 118 is configured to interoperate with the browser by calling Element.getBoundingClientRect( ) for each private UI element. This function returns viewport coordinates of a rectangular screen area corresponding to each private UI element. These sets of coordinates define private areas. In some examples, as an added precaution, the privacy agent 118 is configured to interoperate with the browser to traverse a DOM representation of the UI upward (e.g., via a parentNode property of a private UI element) to identify a container of the private UI element. In these examples, the privacy agent 118 is configured to identify a private area of the container using the Element.getBoundingClientRect( ) as described above. It should be noted that some examples of the privacy agent 118 implement similar approaches that utilize UI automation application program interfaces (APIs) to identify private areas within monitored application 130.

In some examples, the privacy agent 118 is configured to interoperate with the recording agent 116 to protect private information from unsecured recording via the recording agent 116. In certain examples, the privacy agent 118 is configured to transmit one or more messages including coordinates and/or other identifiers of private areas to the recording agent 116. Additionally or alternatively, in some examples, where the fingerprint identifies a UI element selectable to render private information, the privacy agent 118 is configured to alter the click handler of the UI element(s) within private areas to expressly notify the recording agent 116 to obfuscate the UI rendered in response to receiving a click.

In some examples, the recording agent 116 is configured to receive and process the messages from the privacy agent 118 to produce two distinct recordings during rendering of private information within a computing session. In these examples, during initialization of a session recording, the recording agent 116 is configured to receive an encryption key for the session recording from the session recording server 108 via a connection implemented using a secure communications protocol, such as transport layer security (TLS). The recording agent 116 is also configured to parse the messages from the privacy agent 118 to retrieve the identifiers of the private areas, to record the UI to produce a clear recording in which the private areas are clear and intelligible, and to encrypt the clear recording using the previously received session key. Further, in these examples, the recording agent 116 is configured to obfuscate, at least, the private areas in the clear recording to generate an obfuscated recording and to transmit both the encrypted clear recording and the obfuscated recording to the session recording server 108 for subsequent processing. In at least some examples, the recording agent 116 is further configured to delete the session key upon completion of the session recording.

The recording agent 116 can be configured to use a variety of obfuscation techniques when producing recordings in which the private areas are unintelligible. For instance, in some examples, the recording agent 116 is configured to drop frames depicting private information from the clear recording to generate the obfuscated recording. In these examples, the one or more messages transmitted by the privacy agent 118 can include a first message that identifies a first frame and a second message that identifies a second frame. In these examples, the recording agent 116 is configured to drop the first frame and all frames between the first frame and the second frame from the clear recording to generate the obfuscated recording.

In some examples, the recording agent 116 is configured to overlay private areas within the clear recording with blackened or blurred sets of pixels to generate the obfuscated recording. In some examples, where private information is relegated to a private monitor within a multi-monitor setup, the recording agent 116 is configured to remove frames rendered on the private monitor from the clear recording to generate the obfuscated recording. It should be noted that where the monitored application 130 includes a virtual workspace application, the privacy agent 118 can be configured to transmit a request to the virtual workspace application to render UI elements including private information only on the private monitor, thereby configuring a multi-monitor setup to leverage this obfuscation technique.

In certain examples, the privacy service 120 is configured to provide the privacy agent 118 with a local copy of the fingerprint data store 110 so that the privacy agent 118 can expeditiously lookup fingerprints. In these examples, the privacy service 120 can be configured to provide the local copy in response to a request received from the privacy agent 118 and/or to push the local copy to the privacy agent 118 during initialization of the privacy protection system 100 or in response to an update of the fingerprint data store 110.

In some examples, the session recording server 108 is configured to receive the obfuscated recording and the encrypted clear recording of the computing session from the recording agent 116. In these examples, the session recording server 108 is configured to store the obfuscated recording in the session data store 106 as obfuscated session data 128 associated with an identifier of the computing session and to store the encrypted clear recording in the session data store 106 as the encrypted session data 126 associated with the identifier of the computing session. Further, in these examples, the session recording server 108 is configured to store an association between the identifier of the computing session and an identifier of the user who conducted the computing session. The encrypted session data 126 and the obfuscated session data 128 can be subsequently utilized by the session player 102 to protect private information during session playback.

It should be noted that, in certain examples, the session recording server 108 is configured to initiate, via interoperation with the privacy service 120, generation of an encryption key unique to each session recording during initialization of the session recording, to receive this session key from the privacy service, 120 and to transmit the session key to the recording agent 116 via a TLS connection. In some examples, the session recording server 108 is configured to initiate generation the session key by requesting the session key from the privacy service 120. In these examples, the privacy service 120 is configured to generate the session key and to store the session key in association with the session recording within the key data store 104.

Additional features of enhanced session recording processes that the system 100 is configured to execute in some examples are described further below with reference to FIGS. 2 and 5.

Protected Session Playback

In some examples, the session player 102 is configured to render session data during playback of session recordings. In these examples, the session player 102 is configured to establish a secure connection with the session recording server 108 and to request, from the session recording server 108, access to session data associated with one or more session recordings targeted for playback. The session player 102 is also configured to receive session data from the session recording server 108 and to render the session data via a user interface. To protect private information by default, the session recording server 108 initially transmits the obfuscated session data 128 to the session recording player 102 for rendering, according to various examples. In certain examples, the session player 102 also renders a UI control selectable to request clarification of the obfuscated session data. To handle selection of this UI control, the player 102 of the session player 102 is configured to transmit a clarification request to the privacy service 120, thereby initiating a notification and/or approval process that the privacy service 120 is configured to execute.

In some examples, the privacy service 120 is configured to receive and process requests to clarify the obfuscated session data 128 from the session player 102. These requests can be generated, for example, during playback of the obfuscated session data 128 by the session player 102. To handle these clarification requests in some examples, the privacy service 120 can be configured to execute a notification process in which the privacy service 120 interoperates with the notification service 112 to generate and transmit a notification message to the notification agent 114 associated with the user whose computing session is subject to the clarification request. For added security, in some examples, the privacy service 120 is configured to execute an approval process in which the privacy service 120 interoperates with the notification service 112 to generate and transmit one or more approval request messages to one or more notification agents like the notification agent 114. Each of the one or more notification agents is associated with a designated user whose approval is required to authorize the clarification request. Examples of such designated users can include the user whose computing session is subject to the clarification request, administrative users, administrative users, and other users within the same organization, such as legal or executive personnel. In some examples, the privacy service 120 is configured to receive responses to the approval requests from the notification service 112 and to process the responses to determine whether to grant the clarification request. In should be noted that the notification service 112 may be a part of a virtual workspace service, in certain examples.

To handle situations in which playback is authorized via the notification process and/or the approval process described above, the privacy service 120 is configured to retrieve the session key associated with the encrypted session data 126 from the key data store 104. In some examples, the privacy service 120 is also configured to decrypt the encrypted session data 126 using the session key and provide the resulting, clear session data to the session player 102. The session player 102, in turn, is configured to playback the clear session data, which includes private information. To increase user confidence in the authenticity of the clear session data, in some examples the privacy service 120 is configured to overlay one or more frames included in the clear session data with a watermark or some other indicator of source.

In another example, the privacy service 120 is configured to provide the session key and the encrypted session data 126 to the session player 102, and the session player 102 is configured to decrypt the encrypted session data 126 using the session key to generate clear session data. For added security in some of these examples, the privacy service 120 is configured to decrypt the encrypted session data 126 to generate clear session data, generate a new session key, re-encrypt the clear session data using the new session key to generate re-encrypted session data, and provide the new session key and the re-encrypted session data to the session player 102. In these examples, the session player 102 is configured to decrypt the re-encrypted session data using the new session key. This approach decreases system exposure by limiting use of the original encryption to the session recording server 108.

In another example, the privacy service 120 is configured to decrypt the encrypted session data 126 using the session key to generate clear session data, generate a new session key, re-encrypt the clear session data using the new session key to generate re-encrypted session data, replace the original session key stored in the key data store 104 with the new session key, replace the encrypted session data 126 with the re-encrypted session data, and transmit the original session key and the encrypted session data 126 to the session player 102. In these examples, the session player 102 is configured to decrypt the encrypted session data using the original session key. This approach decreases system exposure by limiting use of the new encryption key to the session recording server 108.

In some examples, the designated users who can authorize a clarification request are setup within the system 100 during its initial configuration. In these examples, the privacy service 120 can be configured to receive and process a request to create an encryption key based on a personal identification number (PIN) for each designated user. To process each request, the privacy service 120 is configured to parse the request to retrieve a PIN stored therein, hash the PIN with salt, and store the PIN-based key in the key data store 104.

In certain examples, for added security, the privacy service 120 is configured to encrypt session keys using one or more PIN-based keys prior to storing these PIN-encrypted session keys within the key data store 104. In certain examples, multiple PIN-encrypted session keys for each recording session are stored in the key data store 104 with each PIN-encrypted session key being associated with a designated user. In these examples, the notification service 112 is configured to generate and transmit approval request messages that include a prompt for the designated user to enter a PIN if the designated user approves of the clarification request.

Further, in these examples, the privacy service 120 is configured to receive responses to the approval requests; to parse the responses to retrieve each PIN; and, where the clarification request is authorized, retrieve the PIN-encrypted session key stored in the key data store 104 in association with the PIN and the session recording subject to the clarification request. For added security, the privacy service 120 can be configured to verify the responses to the approval requests have not been tampered with by, for example, validating checksums and/or authenticating certificates included in the responses. The privacy service 120 can be further configured to decrypt the PIN-encrypted session key to generate the session key and execute processes using the session key as described above.

In some examples, the privacy service 120 is configured to receive and process requests to change PINs of designated users. In these examples, the privacy service 120 is configured to parse each request to retrieve the old PIN and the requested PIN, retrieve PIN-encrypted session keys associated with the old PIN in the key data store 104, decrypt the PIN-encrypted session keys using the old PIN to generate the session keys, re-encrypt the session keys using the requested PIN to generate new PIN-encrypted session keys, and store the new PIN-encrypted session keys in the key data store 104. Alternatively or additionally, in some examples, the privacy service 120 is configured to utilize identifiers other than PINs. For instance, in at least one example, the privacy service 120 is configured to retrieve a password hash of a designated user's directory service credentials via one or more API call supported by the directory service and execute processes as described above with the password hash instead of or in addition to the PIN.

Additional features of protected session playback processes that the system 100 is configured to execute in some examples are described further below with reference to FIG. 6.

UI Change Detection

As explained above, in some examples, the recording agent 116 and the privacy agent 118 are configured to receive the UI data and determine whether the UI data includes changes from previously analyzed UI data. In some examples, either or both of the recording agent 116 and the privacy agent 118 can be configured to implement a filter to detect these changes.

The particular configuration of the filter can vary with the type of the UI data available to be processed. For instance, in certain examples, the UI data represents a complete screen of the UI of the monitored application. In these examples, the filter is configured to maintain (e.g., in memory) a previous version of UI data to compare against a current version of the UI data to identify differences, which may include private information.

In one example, the filter is configured to compare the HTML data to previously received HTML data to determine whether the HTML data includes one or more changed HTML elements. To facilitate comparison of the HTML data and the previously received HTML data, the HTML data can be received and/or stored in a first DOM and the previously received HTML data can be received and/or stored in a second DOM. To identify changed HTML elements, the filter can be configured to scan each DOM from its root object downward and to generate a set of identified objects within the first DOM that have no corresponding object in the second DOM or that have a corresponding object with different attributes in the second DOM. This set of identified objects within the first DOM can represent the one or more changed UI elements.

In some examples, the filter is further configured to remove identified objects that will not be reflected in the UI from the set of identified objects. For instance, in some examples, the filter is configured to access the cascading styles sheets (CSS) attribute of identified objects and remove, from the set of identified objects, any identified objects for which the CSS attribute is set to "none." In other examples, the filter is further configured to call the window.getComputedStyle( ) function to determine whether any HTML elements within the DOM that are applied to an identified object would cause it to not be reflected in the UI. The filter removes any such objects from the set of identified objects. In still other examples, the filter is further configured to assess the zIndex property of identified objects and remove, from the set of identified objects, any members that would not be reflected in the UI due to obstructions caused by other objects.

In another example, the filter is configured to construct a current representation of the UI using the UI automation messages and/or the hook messages and to compare the current representation to a previously constructed representation. In some examples, the filter interoperates with the UI automation and/or hook operating system processes to construct the representations used for comparison purposes. More specifically, the filter is configured to construct the representations by enumerating each automation or hook element of the UI and determining, via attributes of each element, whether the element is to be visibly rendered within the UI. Elements that are to be visibly rendered are included in a representation. Elements that are not to be visibly rendered are not included in the representation.

In this example, to identify changed automation or hook elements, the filter can be configured to scan each representation from its root element downward and to generate a set of identified elements within the current representation that have no corresponding element in the previous representation or that have a corresponding element with different attributes in the previous representation.

In some examples, the filter is configured to receive notifications that identify the changed DOM objects or automation/hook elements. In these examples, the processing executed by the filter is minimal, as the changed objects or elements are identified within the notifications. To enable the filter to receive notifications that identify the changed objects or elements, the filter can be configured to transmit a subscription request to the automation or hook process that monitors the monitored application 130 and/or to the monitored application 130 itself. For instance, in some examples where the monitored application 130 is a browser or includes an embedded browser, the filter is configured to interoperate with the browser via the MutationObserver Web API to subscribe to notifications regarding DOM events. The MutationObserver Web API can provide a set of events together, which allows the filter to operate more efficiently. Each notification provided by the MutationObserver Web API includes details of changed objects. In some examples, the filter is configured to process the details, such as new objects added to the DOM and/or attribute changes to existing objects in the DOM. In a similar fashion, the filter can be configured to subscribe to Windows UI events via the UI Automation Framework API for various types of controls. The filter is also configured to take no additional action where no changed objects or elements are identified.

As described above, many of the examples described herein compare fingerprints to changes in UI data. It should be noted that this difference-based comparison is not required in all examples. For instance, in some examples, processes such as the privacy agent 118 are configured to compare fingerprints to full sets of UI data (i.e., UI data that includes unchanged UI elements). As such, the examples disclosed herein not limited to examples that only utilize changes to UI data for comparative, or other, purposes.

Figure 14B:
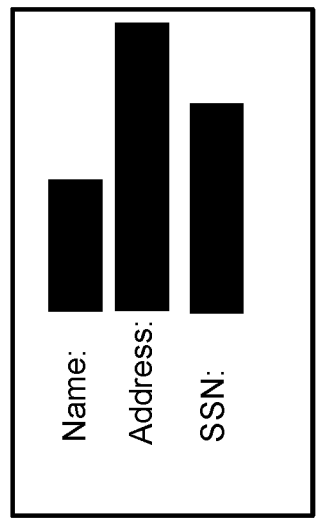
FIG. 14B is a front view of the UI screen of FIG. 14A with the private data obfuscated.
Figure 14A:
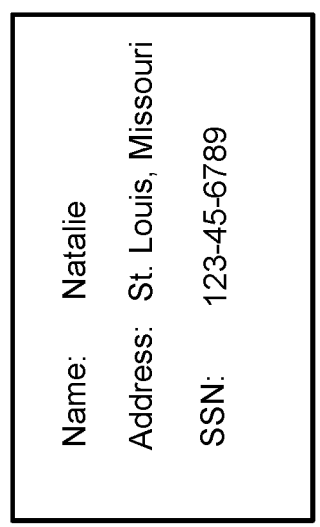
FIG. 14A is a front view of a user interface (UI) screen including private data.

FIGS. 14A and 14B illustrate a window rendered by one example of the monitored application 130. As shown in FIG. 14A, the window includes private information (e.g., the name, address and social security number of a user). As shown in FIG. 14B, the private information is protected by obfuscation. According to the examples disclosed herein, session players render the window illustrated in FIG. 14B by default but can render the window illustrated in FIG. 14A upon completion of a notification/approval process as described herein.

Virtual Workspace Example

Figure 7:
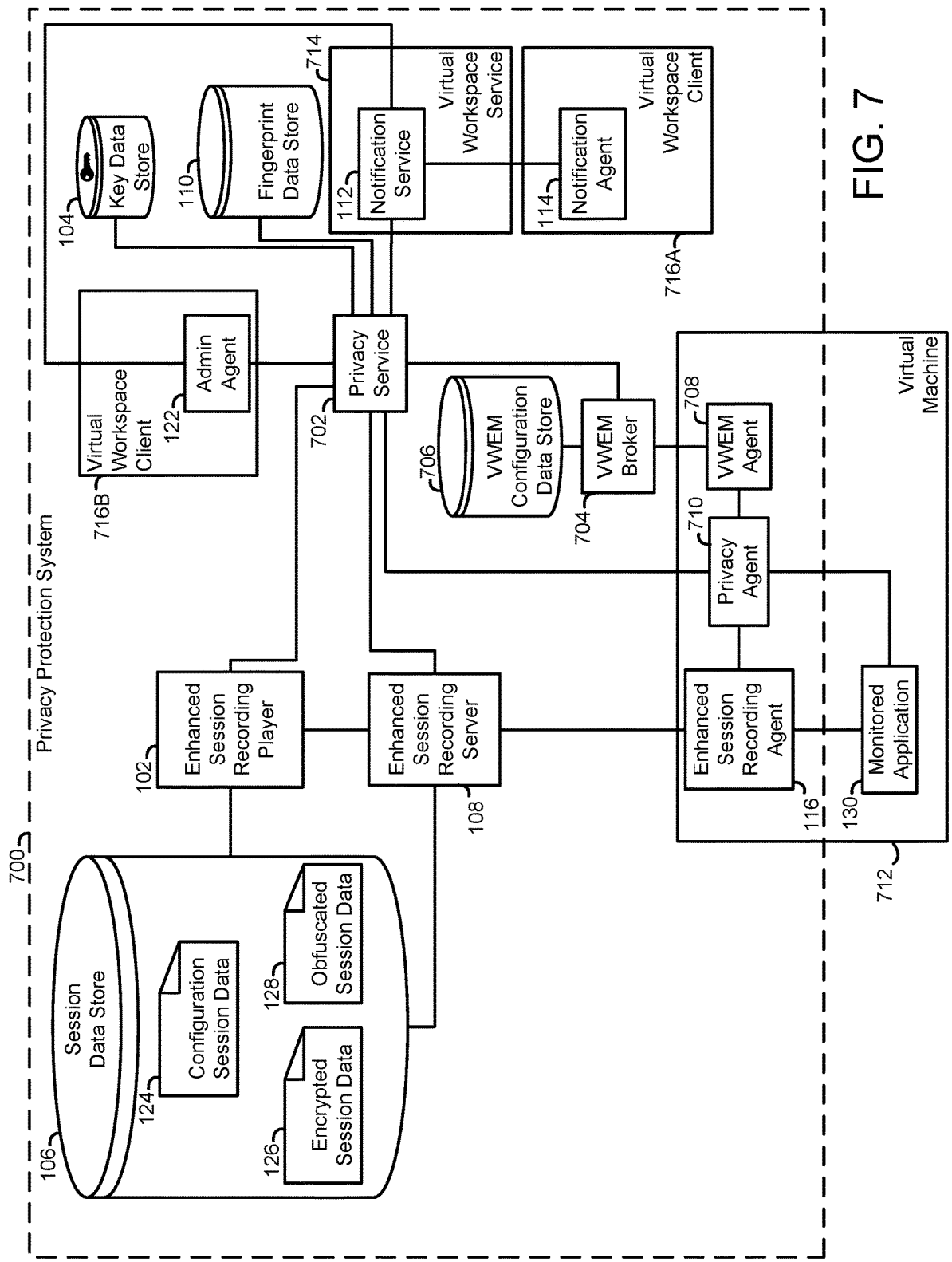
FIG. 7 is a block diagram of the privacy protection (PP) system of FIG. 1 when implemented within a virtualized environment in accordance with an example of the present disclosure.

In some examples, the system 100 can be implemented within a virtual workspace system to protect private information generated by monitored applications within the virtual workspace. FIG. 7 illustrates a logical architecture of a privacy protection system 700 in accordance with these examples. Some of the processes and data stores illustrated in FIG. 7 are described above with reference to FIG. 1. For purposes of brevity, those descriptions will not be repeated here, but each of these processes and data stores is configured to function with reference to FIG. 7 as described with reference to FIG. 1. The description of these processes and data stores may, however, be augmented or refined below.

As shown in FIG. 7, the system 700 includes the session recording player 102, the key data store 104, the session data store 106, the session recording server 108, a fingerprint data store 110, the notification service 112, the notification agent 114, the recording agent 116, and the administrative agent 122. The session data store 106 includes configuration session data 124, encrypted session data 126, and obfuscated session data 128. The system 700 further includes a privacy service 702, a virtual workspace environment manager (VWEM) data store 706, a VWEM broker 704, a VWEM agent 708, a privacy agent 710, a virtual workspace service 714, a virtual workspace (VW) client applications 716A and 716B, and a virtual machine 712.

In some examples, the privacy service 702 is configured with the functionality of the privacy service 120 of FIG. 1. In addition, the privacy service 702 is configured to interoperate with a virtual workspace environment manager (VWEM) server, such as the VWEM broker 704, to distribute fingerprints to privacy agents, such as the privacy agent 710. In these examples, the privacy service 702 is configured to transmit new fingerprints to the VWEM broker 704 in response to occurrence of an event, such as creation of a new fingerprint, expiration of a timer, and/or initiation of a new recording session. The VWEM broker 704, in turn, is configured to store the new fingerprints in the VWEM configuration data store 706 and transmit the new fingerprints to the VWEM agent 708. The VWEM agent 708 is configured to store the new fingerprints in a data store local to the virtual machine 712. The privacy agent 710 is configured to retrieve the new fingerprints from the local data store upon receiving a message from the VWEM agent 708 indicating their availability or on a periodic basis. The privacy agent 710 is configured to use the new fingerprints to detect and protect private information, as described above with regard to the privacy agent 118 of FIG. 1.

In certain examples, the virtual workspace clients 716A and 716B are configured to host the notification agent 114 and the administration agent 122, respectively. The virtual workspace service 714 is configured to host the notification service 112, and the virtual machine 712 is configured to host the monitored application 130, the recording agent 116, the privacy agent 710, and the VWEM agent 708.

Additional features of fingerprint distribution processes that the system 700 is configured to execute in some examples are described further below with reference to FIG. 8.

Privacy Protection Processes

As described above, some examples of the system 100 of FIG. 1 are configured to execute session recording processes. FIG. 2 illustrates one example of such a process, a session recording process 200 enhanced to protect private information.

The process 200 starts with the system 100 executing 202 one or more configuration processes. These configuration process can result in storage of a set of fingerprints indicative of, and associated with, private information. As described above with reference to FIG. 1, the system 100 supports several distinct configuration processes for storing the set of fingerprints. For instance, in one example illustrated with reference to FIG. 3, an administrative agent (e.g., the administrative agent 122 of FIG. 1) receives input from administrative personnel specifying UI elements to include in the set of fingerprints and interoperates with a privacy service (e.g., the privacy service 120 of FIG. 1) to generate and store the set of fingerprints in a fingerprint data store (e.g., the fingerprint data store 110).

Figure 3:
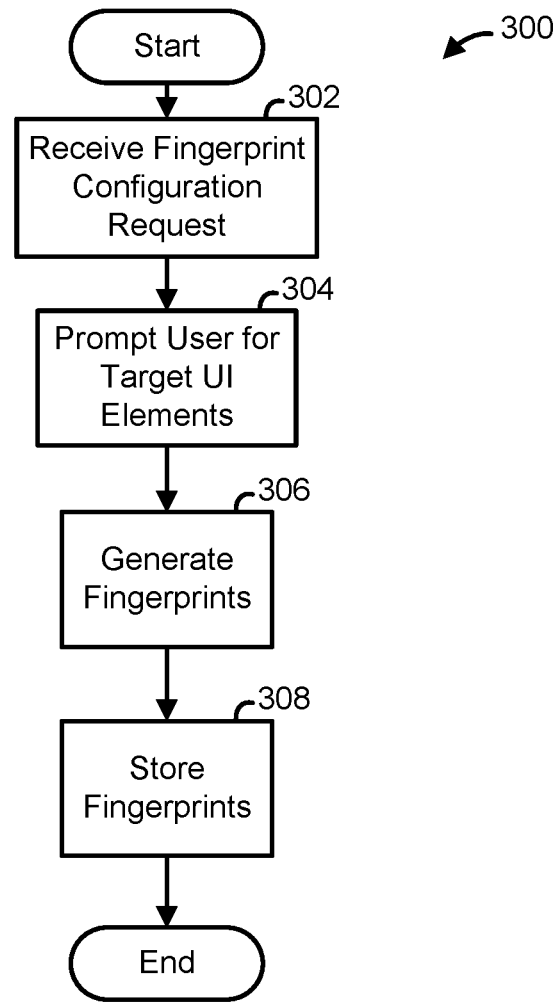
FIG. 3 is a flow diagram of a configuration process in accordance with an example of the present disclosure.

As shown in FIG. 3, a configuration process 300 starts with the administrative agent receiving 302 input requesting configuration of one or more fingerprints. For instance, the administrative agent can receive the input via a UI rendered by the administrative agent to an administrative user. In response to reception of this request, the administrative agent renders 304 prompts configured to receive input specifying one or more target UI elements indicative of private information. The prompts can include, for example, text boxes or other UI controls configured to receive string values that specify URIs, application titles, window titles, field names, and the like.

Upon receiving input specifying the one or more target UI elements, the administrative agent transmits data specifying the one or more target UI elements to the privacy service, and the privacy service generates 306 fingerprints that include the one or more target UI elements. For instance, the privacy service can store a text string specifying each target UI element within the fingerprint. The privacy service next stores 308 the fingerprints within a fingerprint data store (e.g., the fingerprint data store 110 of FIG. 1) for subsequent processing, and the process 300 ends.

Figure 4:
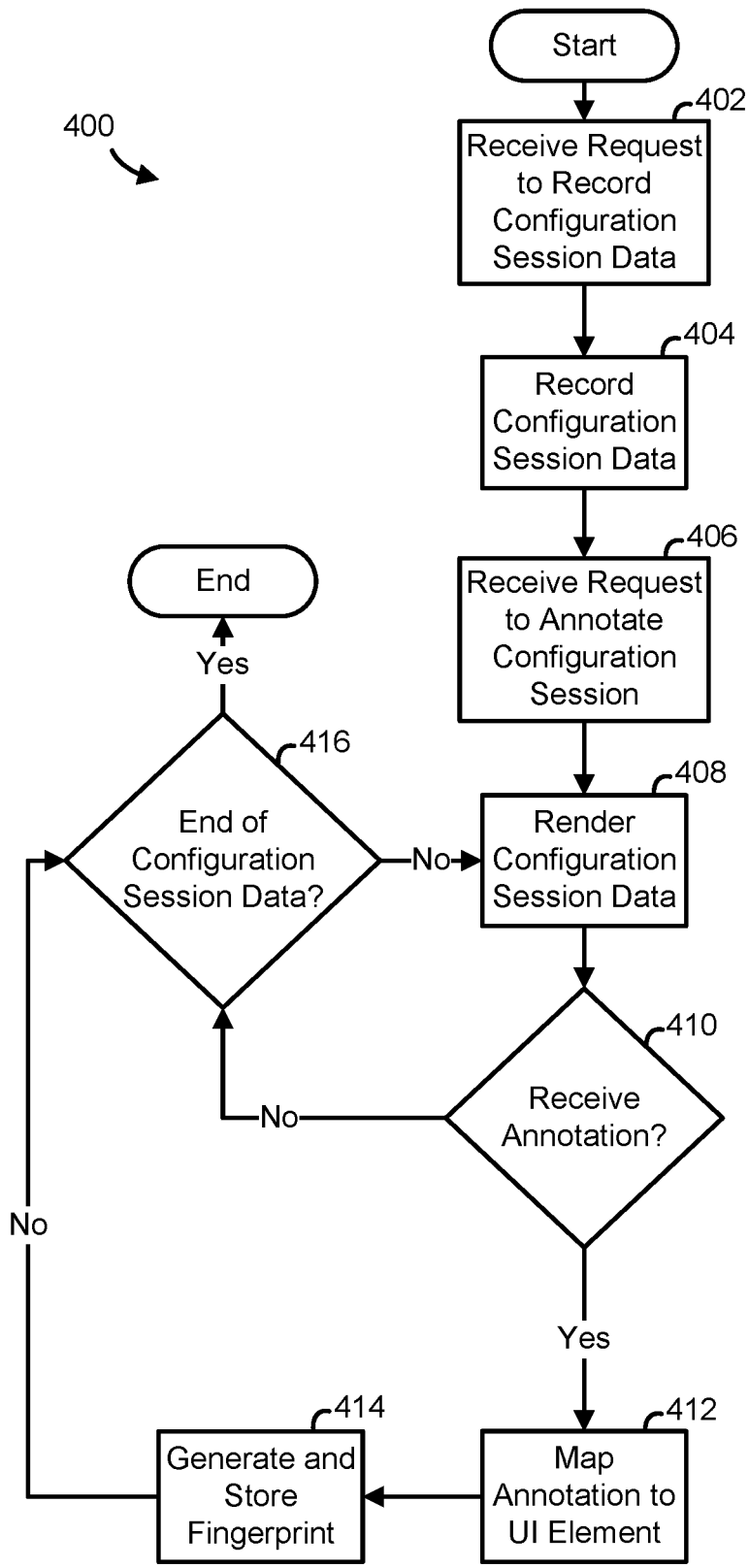
FIG. 4 is a flow diagram of another configuration process in accordance with an example of the present disclosure.

In another example, which is illustrated in FIG. 4, a recording agent (e.g., the enhanced recording session agent 116 of FIG. 1) records configuration session data (e.g., the configuration session data 124 of FIG. 1) descriptive of a user-interactive computing session in which private information is accessed. In these example, a session player (e.g., the enhanced session recording player 102 of FIG. 1) subsequently receives annotations of UI frames during playback of the configuration session data, maps the annotations to UI elements, and interoperates with the privacy service to generate and store a set of fingerprints representative of the UI elements in the fingerprint data store.

As shown in FIG. 4, a configuration process 400 starts with the recording agent receiving 402 input requesting recordation of configuration session data. In response to reception of this request, the recording agent interoperates with a session recording server (e.g., the enhanced session recording server 108 of FIG. 1) to initiate and record 404 a user-interactive computing session in which private information is accessed. The configuration session data generated during recordation of the user-interactive computing session can include session data (e.g., ICA data) and UI data (e.g., changes in HTML or another representation of the UI rendered within the computing session). The user-interactive computing session can be supervised/conducted by administrative personnel or not supervised/conducted by administrative personnel.

Further, in this example, the session player receives 406 a request to annotate the configuration session data. For instance, the session player can receive 406 input via a user interface rendered by the session player. In response to reception of this request, the session player renders 408 the session data included within the configuration session data. While rendering 408 the session data (e.g., after each frame of session data is played back), the session player determines 410 whether it has received any annotations. In this example, annotations indicate UI controls including private information or UI controls linked to other controls including private information.

Where the session player determines 410 that it has received an annotation, the session player maps 412 the annotations to UI elements corresponding to and used to render the UI controls indicated by the annotations. For instance, the session player can identify one or more target UI elements that match coordinates of the annotated UI controls via the UI data stored in the configuration session data. Next, the session player transmits a message specifying the one or more target UI elements to the privacy service and proceeds to determine 416 whether playback has reached the end of the session data. The privacy service receives the message, generates 414 fingerprints that include the one or more target UI elements, and stores 414 the fingerprints within the fingerprint data store for subsequent processing.

Where the session player determines 410 that it has not received an annotation, the session player determines 416 whether the playback has reached the end of the session data included in the configuration session data. Where the session player determines 416 that playback has not reach the end of the session data, the session player returns to rendering 408 the session data. Where the session player determines 416 that playback has reached the end of the session data, the process 400 ends.

Processes in accord with the configuration process 300 and 400 enable a system to generate and store fingerprints that can be subsequently used to identify private information for protective purposes.

Returning to the process 200, the recording agent receives 204 a request to record a new user-interactive computing session (e.g., via input received from a user interface rendered by the recording agent) and initiates 206 a new session recording by transmitting a request to initialize the new recording to the session recording server. The session recording server receives and processes the new recording request by transmitting a request for a new session key to the privacy service. The privacy service receives, processes, and responds to the new key request by, for example, generating a new session key, storing a copy of the new session key in a key data store (e.g., the key data store 104 of FIG. 1), and transmitting a response including a copy of the new session key to the session recording server. The session recording server receives the response, parses the response to retrieve the new session key, and transmits a response to the new recording request that includes a copy of the new session key. The recording agent receives the response, parses the response to retrieve the copy of the new session key, and stores the new session key in memory for subsequent processing. Additionally, in some examples, as part of session recording initialization, the privacy service transmits a current set of fingerprints to a privacy agent (e.g., the privacy agent 118 of FIG. 1) configured to monitor the UI of the computing session being recorded.

Continuing the process 200, the privacy agent receives 208 UI data representative of the UI of the computing session being recorded and identifies changes to the UI data. For instance, the privacy service can identify differences using a filter as described above. Meanwhile, the recording agent generates 210 a clear recording of computing session (including the UI of the computing session). The privacy agent determines 212 whether the changes in the UI data include any private information by comparing the changes in the UI data to the current set of fingerprints. FIG. 5 illustrates one example of a fingerprint detection process 500 executed by the privacy agent to determine 212 whether the changes to the UI data include private information. Within the process 500, the privacy agent scans changes to the UI data for the presence of fingerprints associated with private information. More specifically, in some examples, the privacy agent monitors changes in UI data of one or more monitored applications (e.g., the monitored application 130 of FIG. 1) for indications of private information by comparing the changes in the UI data to the fingerprints, as described above.

Figure 5:
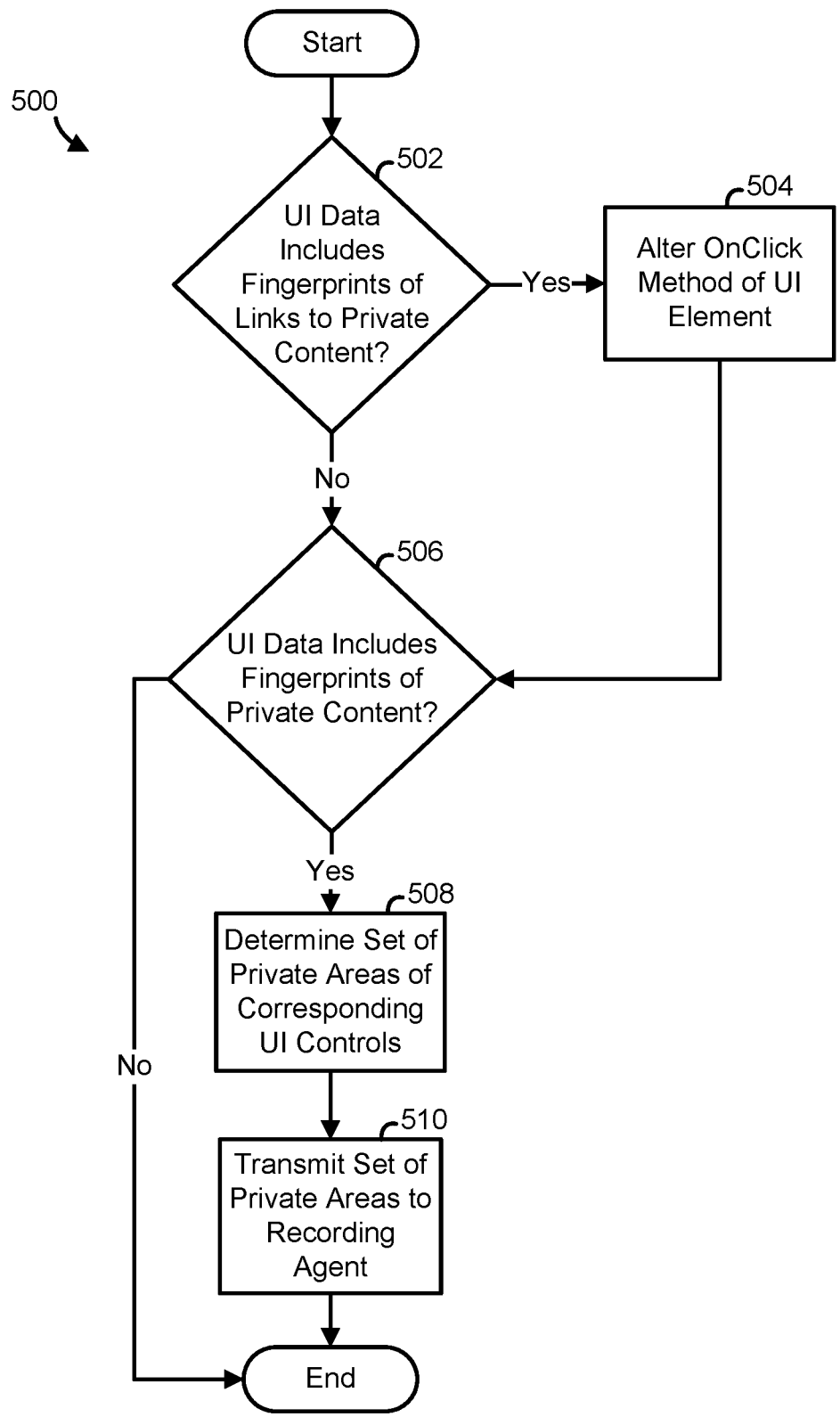
FIG. 5 is a flow diagram of fingerprint detection process in accordance with an example of the present disclosure.

As shown in FIG. 5, the process 500 starts with the privacy agent determining 502 whether the changes to the UI data include fingerprints of links (e.g., UI elements selectable to navigate) to private information. Where the privacy agent determines 502 that the changes to the UI data include fingerprints of links to private information, the privacy agent alters 504 the onclick handler of the link to issue a notification to the recording agent indicating that the link, when executed, will render private information. Where the privacy agent determines 502 that the changes to the UI data do not include fingerprints of links, the privacy agent determines 506 whether the changes to the UI data include fingerprints of private information.

Where the privacy agent determines 506 that the changes to the UI data include fingerprints of private information, the privacy agent determines 508 a set of private areas occupied by UI controls that correspond to the UI element indicated in the fingerprints. For instance, the privacy agent can call Element.getBoundingClientRect( ) for each UI element to identify each private area. Once the private areas are identified, the privacy agent transmits 510 a message to the recording agent that includes data descriptive of the private areas (e.g., coordinate values) and the process 500 ends.

Processes in accord with the process 500 enable a privacy agent to identify fingerprints and notify a recording agent to obfuscate private information associated with the fingerprints.

Returning to the process 200, where the privacy agent determines 212 that the changes to the UI data include no private information and the recording agent receives no notification of private information, the recording agent stores 216 the previously generated 210 clear recording. This storage can be local and/or can be a transmission of the clear recording to the session recording server.

Where the privacy agent determines 212 that the changes to the UI data include private information and the recording agent receives a notification of the same (either from a message form the privacy service or from execution of an onclick handler), the recording agent generates 214 an obfuscated recording based on the previously generated 210 clear recording. For instance, the recording agent can utilize any of various obfuscation methods, as described above.

Continuing the process 200, the recording agent stores 218 the obfuscated recording. This storage can be local and/or can be a transmission of the obfuscated recording to the session recording server. The recording agent encrypts 220 the clear recording using the session key to generate an encrypted recording. The recording agent stores 222 the encrypted recording. This storage can be local and/or can be a transmission of the encrypted recording to the session recording server. The recording agent determines 224 whether the computing session has ended. Where the recording agent determines 224 that the computing session has not ended, the process 200 returns to the privacy agent identifying 208 changes to the UI data of the computing session. Where the recording agent determines 224 that the computing session has ended, the recording agent terminates the session recording, and the process 200 ends. As part of the termination of the session recording, the recording agent transmits any locally remaining portions of the encrypted, obfuscated, and/or the clear recordings to the session recording server. The session recording server, in turn, stores the encrypted recording as encrypted session data (e.g., the encrypted session data 126 of FIG. 1) in association with the computing session in a session data store (e.g., the session data store 106 of FIG. 1), stores the obfuscated recording and the unencrypted clear recording as obfuscated session data (e.g., the obfuscated session data 128 of FIG. 1) in association with the computing session in the session data store.

Processes in accord with the process 200 enable a privacy protection system to record computing sessions in a manner that protects private information.

As described above, some examples of the system 100 of FIG. 1 are configured to execute session review processes. FIG. 6 illustrates one example of such a process, a session review process 600 enhanced to protect private information.

Figure 6:
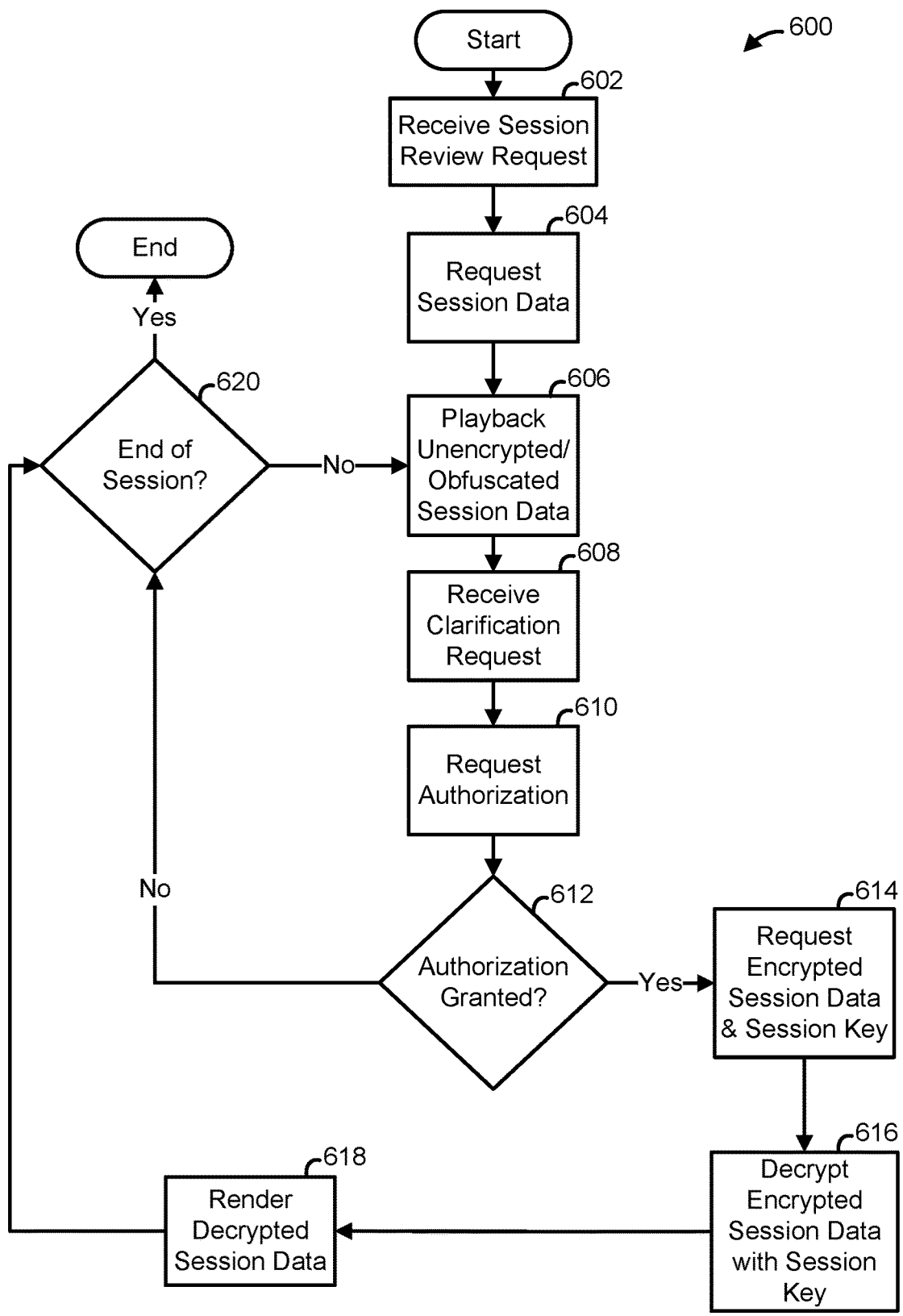
FIG. 6 is a flow diagram of an enhanced session review process in accordance with an example of the present disclosure.

As shown in FIG. 6, the process 600 starts with the session player receiving 602 a request to review a previously recorded computing session. For instance, the session player can receive input selecting the computing session from a UI rendered by the session player. In response to reception of this request, the session player transmits 604 a playback request to the session recording server. The session recording server receives, processes, and responds to the playback request by identifying obfuscated session data associated with the previously recorded computing session identified in the playback request and streams the identified obfuscated session data to the session player. The session player, in turn, renders 606 the obfuscated session data via its UI.

During playback of the obfuscated session data, the session player receives 608 a request to clarify obfuscated session data. For example, the session player can receive input selecting an obfuscated UI control. Responsive to reception of the input, the session player generates and transmits 610 a clarification request to the session recording server.

The session recording server receives and processes the clarification request by initiating a notification and/or approval process, as described above. For instance, in some examples, the session recording server interoperates with a notification service (e.g., the notification service 112 of FIG. 1) to generate and transmit notifications and/or approval requests to notification clients (e.g., the notification agent 114 of FIG. 1). The notification clients can be associated with one or more designated users, such as the user whose private information is subject to the clarification request, an administrative user, and/or executive or legal personnel. In some examples, the notification clients prompt designated users for PINs or other credentials to approve of an authorization request. Upon receiving input approving or denying the authorization request, the notification clients transmit messages reflecting the same to the notification service. The notification service, in turn, responds to the session recording server with a message that indicates whether the authorization request is approved.

Continuing the process 600, the session recording server determines 612 whether the authorization request is approved. Where the session recording server determines 614 that the authorization request is approved, the session recording server transmits a request to the privacy service for a session key associated with the computing session. The privacy service receives, processes, and responds to the request by parsing the request to identify the computing session for which the session key is requested, retrieving the session key from the key data store, and transmitting the session key to the session recording server. As explained above, for added security in some examples, the privacy service may first decrypt an encrypted session key using a PIN-based key also stored in the key data store prior to transmitting the resulting session key to the session recording server.

The session recording server receives the session key and the encrypted session data from the privacy service and decrypts 616 the encrypted session data to generate decrypted, clear session data that depicts the private information subject to the clarification request. As explained above, in some examples for added scalability, the session recording server transmits the session key and the encrypted session data to the session player for decryption.

The session player renders 618 the decrypted session data. The session player determines 620 whether playback has reached the end of the computing session. Where the session player determines 620 that playback has not reached the end of the computing session, the session play continues playback 606. Where the session player determines 620 that playback as reached the end of the computing session, the process 600 ends.

Processes in accord with the process 600 enable a privacy protection system to playback computing sessions in a manner that protects private information.

As described above, some examples of the system 700 of FIG. 7 are configured to execute a fingerprint distribution processes. FIG. 8 illustrates one example of such a process, a fingerprint distribution process 800.

Figure 8:
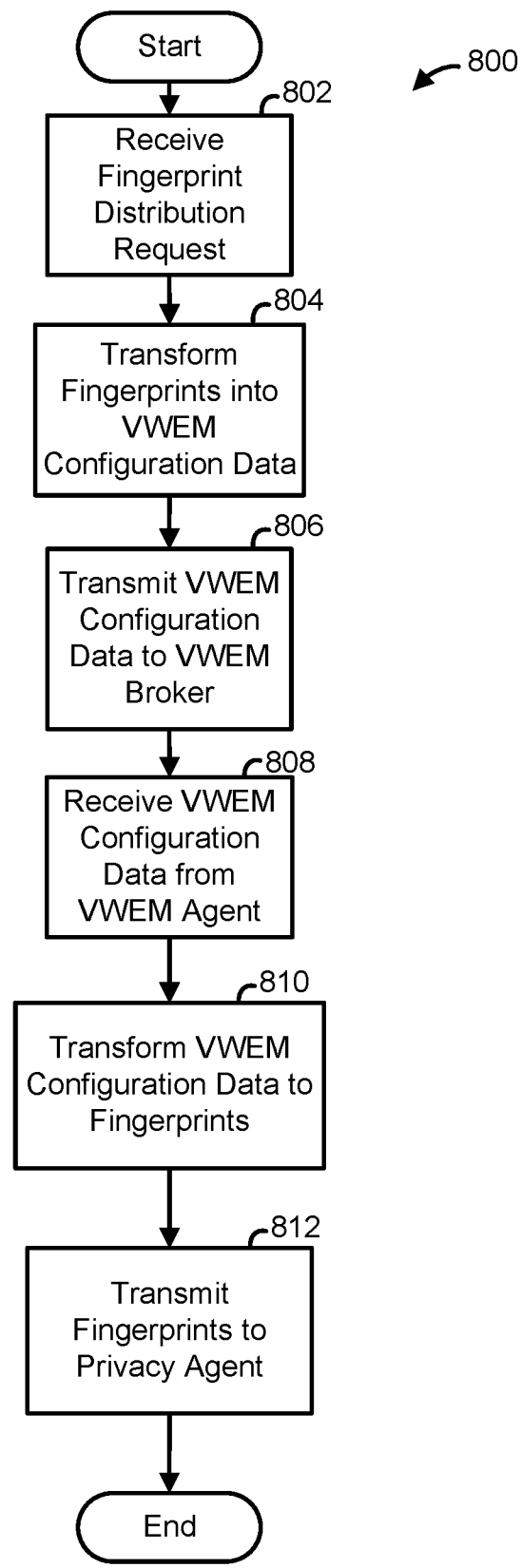
FIG. 8 is a flow diagram of fingerprint distribution process in accordance with an example of the present disclosure.

As shown in FIG. 8, the process 800 starts with a privacy service (e.g., the privacy service 702 of FIG. 7) receiving 802 a request to distribution a new set of fingerprints to one or more privacy agents (e.g., the privacy agent 710 of FIG. 7). For instance, a session recording session recording server (e.g., the enhanced session recording server 108 of FIG. 7) can transmit a distribution request to the privacy service in response to receiving a request to initialize a new session recording.

In response to receiving the distribution request, the privacy service transforms 804 the set of fingerprints into VWEM configuration data and transmits 806 the VWEM configuration data to a VWEM broker (e.g., the VWEM broker 704 of FIG. 7). The VWEM broker stores the VWEM configuration data in a VWEM configuration data store (e.g., the VWEM configuration data store 706 of FIG. 7) and transmits the VWEM configuration data to a VWEM agent (e.g., the VWEM agent 708 of FIG. 7). The VWEM agent receives and stores the configuration data in a data store locally accessible by the VWEM agent. The VWEM agent also transmits the VWEM configuration data to the privacy agent. The privacy agent receives 808 the VWEM configuration data form the VWEM agent, transforms 810 the VWEM configuration data into a copy of the new set of fingerprints, and the process 800 ends.

Processes in accord with the process 800 enable a privacy protection system to utilize a virtual workspace environment management subsystem to distribute new sets of fingerprints to privacy agents.

The processes disclosed herein each depict one particular sequence of acts in a particular example. Some acts are optional and, as such, can be omitted in accord with one or more examples. Additionally, the order of acts can be altered, or other acts can be added, without departing from the scope of the apparatus and methods discussed herein.

Computing Platform for Privacy Protection Systems

Figure 9:
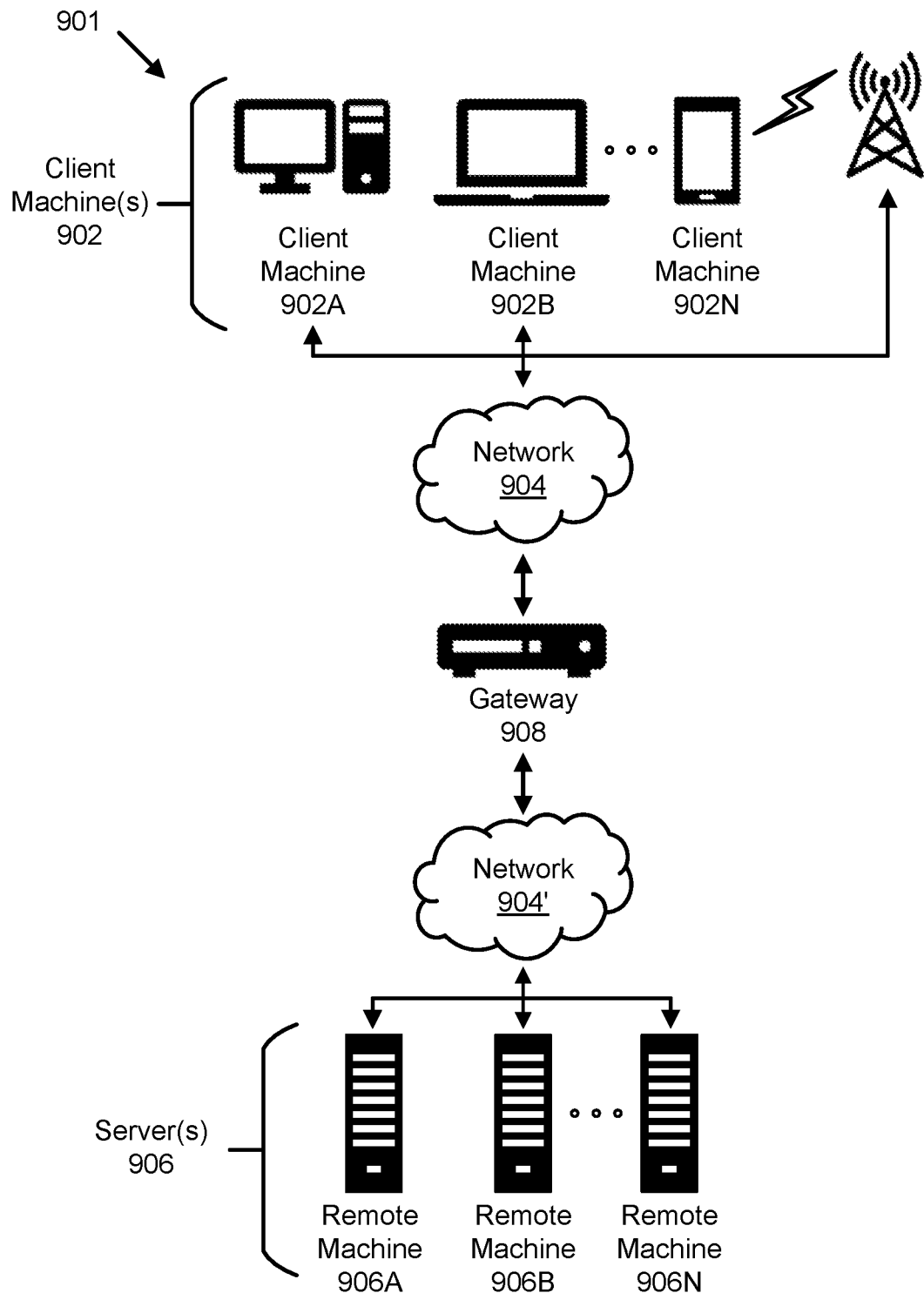
FIG. 9 is a block diagram of a network environment of computing devices in which various aspects of the present disclosure can be implemented.

Referring to FIG. 9, a non-limiting network environment 901 in which various aspects of the disclosure can be implemented includes one or more client machines 902A-902N, one or more remote machines 906A-906N, one or more networks 904, 904', and one or more appliances 908 installed within the computing environment 901. The client machines 902A-902N communicate with the remote machines 906A-906N via the networks 904, 904'. The computing environment 901 can also be referred to as a distributed computer system.

In some examples, the client machines 902A-902N communicate with the remote machines 906A-906N via an intermediary appliance 908. The illustrated appliance 908 is positioned between the networks 904, 904' and may also be referred to as a network interface or gateway. In some examples, the appliance 908 can operate as an ADC to provide clients with access to business applications and other data deployed in a datacenter, the cloud, or delivered as Software as a Service (SaaS) across a range of client devices, and/or provide other functionality such as load balancing, etc. In some examples, multiple appliances 908 can be used, and the appliance(s) 908 can be deployed as part of the network 904 and/or 904'.

The client machines 902A-902N may be generally referred to as client machines 902, local machines 902, clients 902, client nodes 902, client computers 902, client devices 902, computing devices 902, endpoints 902, or endpoint nodes 902. The remote machines 906A-906N may be generally referred to as servers 906 or a server farm 906. In some examples, a client device 902 can have the capacity to function as both a client node seeking access to resources provided by a server 906 and as a server 906 providing access to hosted resources for other client devices 902A-902N. The networks 904, 904' may be generally referred to as a network 904. The networks 904 can be configured in any combination of wired and wireless networks.

A server 906 can be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 906 can execute, operate, or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft Internet Protocol telephone; an application for streaming video and/or audio; an application for facilitating real-time-data communications; a HyperText Transfer Protocol client; a File Transfer Protocol client; an Oscar client; a Telnet client; or any other set of executable instructions.

In some examples, a server 906 can execute a remote presentation services program or other program that uses a thin client or a remote-display protocol to capture display output generated by an application executing on a server 906 and transmit the application display output to a client device 902.

In yet other examples, a server 906 can execute a virtual machine providing, to a user of a client device 902, access to a computing environment. The client device 902 can be a virtual machine. The virtual machine can be managed by, for example, a hypervisor, a virtual machine manager (VMM), or any other hardware virtualization technique within the server 906.

In some examples, the network 904 can be: a local area network (LAN); a metropolitan area network (MAN); a wide area network (WAN); a primary public network 904; and a primary private network 904. Additional examples can include a network 904 of mobile telephone networks that use various protocols to communicate among mobile devices. For short range communications within a wireless local-area network (WLAN), the protocols can include 802.11, Bluetooth, and Near Field Communication (NFC).

Figure 10:
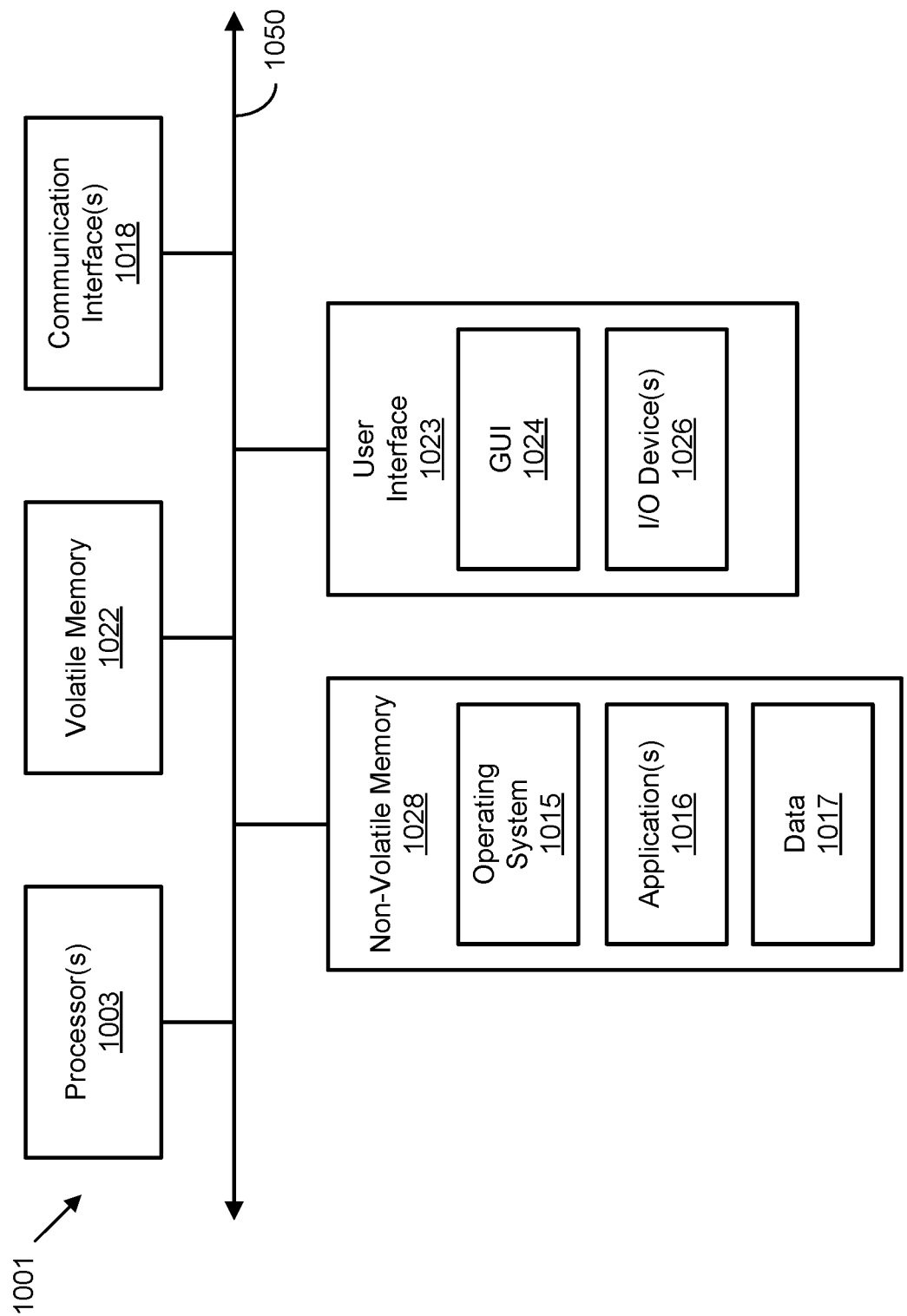
FIG. 10 is a block diagram of a computing device that can implement one or more of the computing devices of FIG. 9 in accordance with an example of the present disclosure.

FIG. 10 depicts a block diagram of a computing device 1001 useful for practicing an example of client devices 902, appliances 908 and/or servers 906. The computing device 1001 includes one or more processors 1003, volatile memory 1022 (e.g., random access memory (RAM)), non-volatile memory 1028, user interface (UI) 1023, one or more communications interfaces 1018, and a communications bus 1050. The computing device 1001 may also be referred to as a computer or a computer system.

The non-volatile memory 1028 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 1023 can include a graphical user interface (GUI) 1024 (e.g., a touchscreen, a display, etc.) and one or more input/output (I/O) devices 1026 (e.g., a mouse, a keyboard, a microphone, one or more speakers, one or more cameras, one or more biometric scanners, one or more environmental sensors, and one or more accelerometers, etc.).

The non-volatile memory 1028 stores an operating system 1015, one or more applications 1016, and data 1017 such that, for example, computer instructions of the operating system 1015 and/or the applications 1016 are executed by processor(s) 1003 out of the volatile memory 1022. In some examples, the volatile memory 1022 can include one or more types of RAM and/or a cache memory that can offer a faster response time than a main memory. Data can be entered using an input device of the GUI 1024 or received from the I/O device(s) 1026. Various elements of the computer 1001 can communicate via the communications bus 1050.

The illustrated computing device 1001 is shown merely as an example client device or server and can be implemented by any computing or processing environment with any type of machine or set of machines that can have suitable hardware and/or software capable of operating as described herein.

The processor(s) 1003 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 1003 can be analog, digital or mixed. In some examples, the processor 1003 can be one or more physical processors, or one or more virtual (e.g., remotely located or cloud) processors. A processor including multiple processor cores and/or multiple processors can provide functionality for parallel, simultaneous execution of instructions or for parallel, simultaneous execution of one instruction on more than one piece of data.

The communications interfaces 1018 can include one or more interfaces to enable the computing device 1001 to access a computer network such as a Local Area Network (LAN), a Wide Area Network (WAN), a Personal Area Network (PAN), or the Internet through a variety of wired and/or wireless connections, including cellular connections.

In described examples, the computing device 1001 can execute an application on behalf of a user of a client device. For example, the computing device 1001 can execute one or more virtual machines managed by a hypervisor. Each virtual machine can provide an execution session within which applications execute on behalf of a user or a client device, such as a hosted desktop session. The computing device 1001 can also execute a terminal services session to provide a hosted desktop environment. The computing device 1001 can provide access to a remote computing environment including one or more applications, one or more desktop applications, and one or more desktop sessions in which one or more applications can execute.

Additional descriptions of a computing device 1001 configured as a client device 902 or as a server 906, or as an appliance intermediary to a client device 902 and a server 906, and operations thereof, may be found in U.S. Pat. Nos. 9,176,744 and 9,538,345. The '744 and '345 patents are both assigned to the current assignee of the present disclosure.

Figure 11:
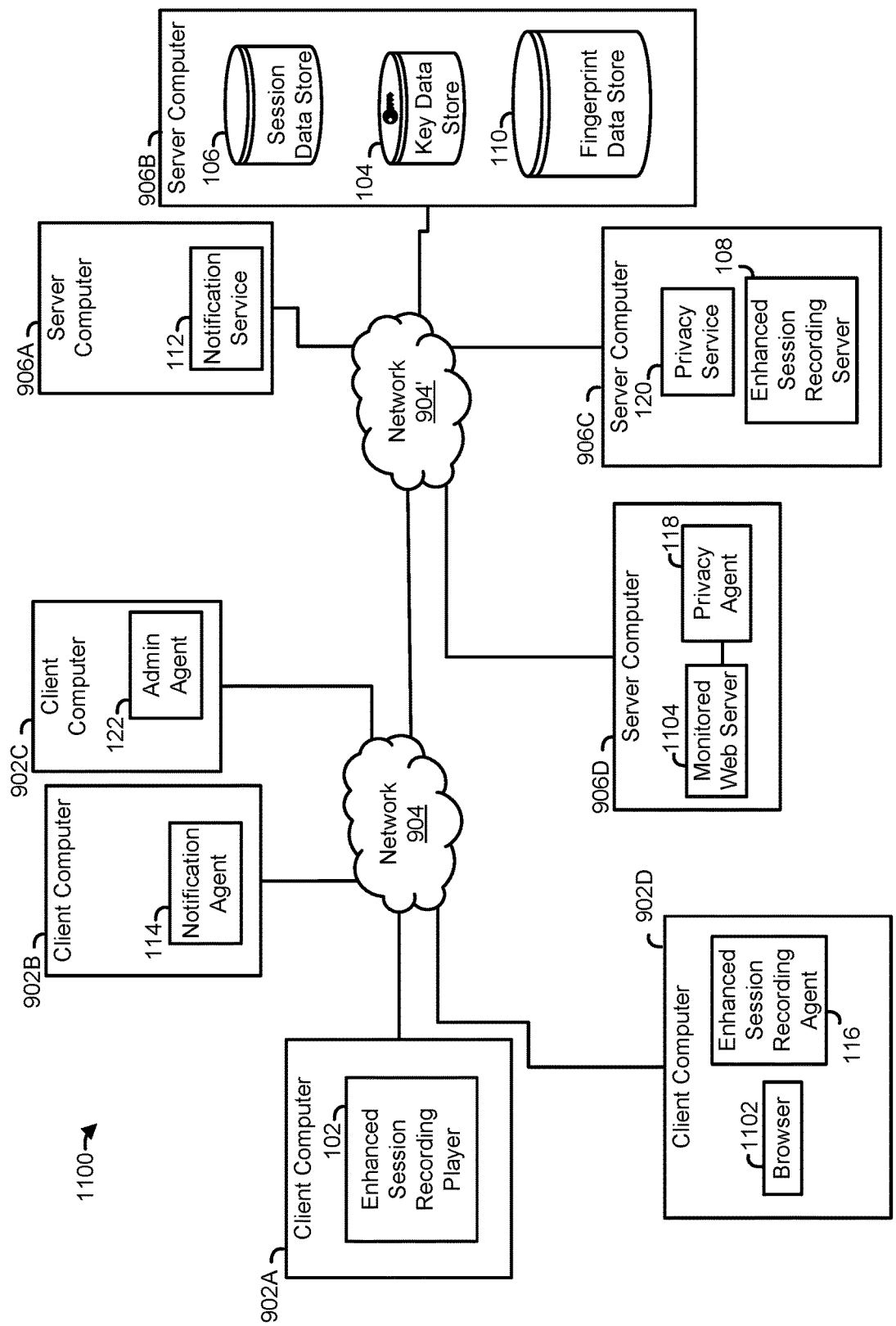
FIG. 11 is a block diagram of the PP system of FIG. 1 as implemented by a configuration of computing devices to protect private information transmitted via a web server in accordance with an example of the present disclosure.

FIG. 11 illustrates a privacy protection system (e.g., the system 100 of FIG. 1) configured for operation within a distributed computing platform (e.g. the network environment 901 of FIG. 9). As shown in FIG. 11, the configuration 1100 includes the client computers 902A-902D and the server computers 906A-906D of FIG. 9. Within the configuration 1100, the computer systems 902A-902D and 906A-906D are communicatively coupled to one another and exchange data via a network (e.g., the networks 904 and/or 904' of FIG. 9).

As shown in FIG. 11, the client 902A is configured to host the session player 102 of FIG. 1. The client 902B is configured to host the notification agent 114 of FIG. 1. The client 902C is configured to host the administrative agent 122 of FIG. 1. The client 902D is configured to host a browser 1102 and the recording agent 116 of FIG. 1. The server 906A is configured to host the notification service 112 of FIG. 1. The server 906B is configured to host the key data store 104, the session data store 106, and the fingerprint data store 110 of FIG. 1. The server 906C is configured to host the privacy service 120 and the session recording server 108 of FIG. 1. The server 906D is configured to host a monitored web server 1104 and the privacy agent 118 of FIG. 1.

Many of the computers, processes, and data stores illustrated in FIG. 11 are described above with reference to FIGS. 1 and 9. For purposes of brevity, those descriptions will not be repeated here, but each of the computers, processes, and data stores of FIGS. 1 and 9 included in FIG. 11 is configured to function with reference to FIG. 11 as described with reference to FIGS. 1 and 9. However, the descriptions of any of these computers, processes, and data stores may be augmented or refined below.

As illustrated in FIG. 11, the monitored web server 1104 is configured to serve a web application to the browser 1102. As part of this service, the monitored web server 1104 is configured to transmit the HTML to the browser 1102 using, for example, HyperText Transfer Protocol (HTTP), and the browser 1102 is configured to load the HTML into a DOM.

In some examples of the configuration 1100, the privacy agent 118 is configured to monitor the HTML served to the browser 1102 for fingerprints indicative of private information and to transmit notifications where fingerprints are detected to the recording agent 116. The recording agent 116, in turn, is configured to generate session recordings in which private areas of the UI of the browser 1102 are obfuscated.

The configuration 1100 is but one example of many potential configurations that can be used to implement the system 100. As such, the examples disclosed herein are not limited to the particular configuration 1100 and other configurations are considered to fall within the scope of this disclosure.

Figure 12:
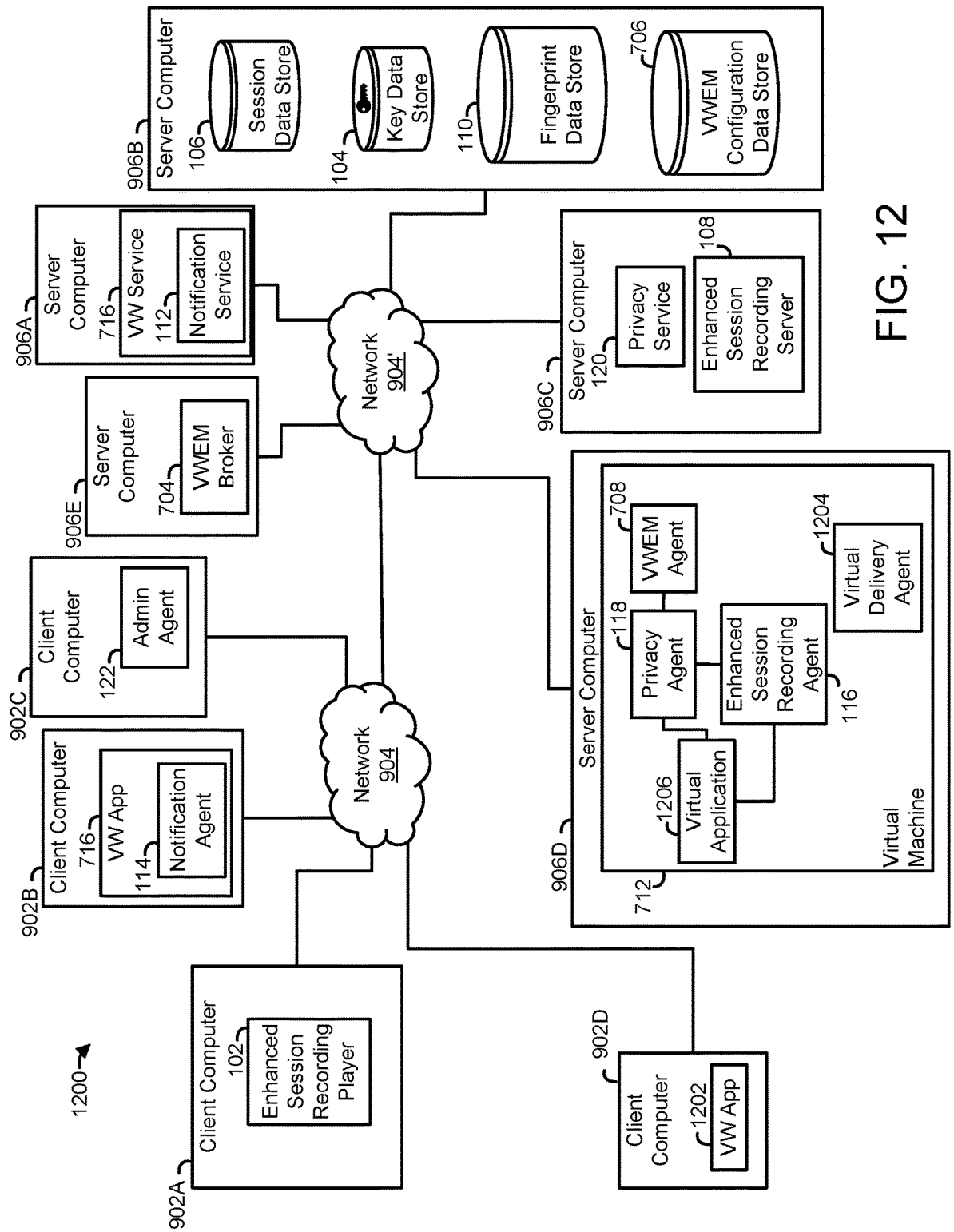
FIG. 12 is a block diagram of the PP system of FIG. 7 as implemented by a configuration of computing devices to protect private information transmitted via a virtual workspace system in accordance with an example of the present disclosure.

FIG. 12 illustrates a privacy protection system (e.g., the system 100 of FIG. 1) configured for operation within a distributed computing platform (e.g. the network environment 901 of FIG. 9) that supports virtual applications. As shown in FIG. 12, the configuration 1200 includes the client computers 902A-902D and the server computers 906A-906E of FIG. 9. Within the configuration 1200, the computer systems 902A-902D and 906A-906E are communicatively coupled to one another and exchange data via a network (e.g., the networks 904 and/or 904' of FIG. 9).

As shown in FIG. 12, the client 902A is configured to host the session player 102 of FIG. 1. The client 902B is configured to host the notification agent 114 of FIG. 1 within the VW client application 716A of FIG. 7. The client 902C is configured to host the administrative agent 122 of FIG. 1 within the VW client application 716B of FIG. 7. The client 902D is configured to host a VW client application 1202. The server 906A is configured to host the notification service 112 of FIG. 1 within the VW service 714 of FIG. 7. The server 906B is configured to host the key data store 104, the session data store 106, and the fingerprint data store 110 of FIG. 1. The server 906C is configured to host the privacy service 120 and the session recording server 108 of FIG. 1. The server 906D is configured to host the virtual machine 712 and the VWEM agent 708 of FIG. 7, the privacy agent 118 and the recording agent 116 of FIG. 1, a virtual application 1206, and a virtual delivery agent 1204. The server 906E is configured to host the VWEM broker 704 of FIG. 7.

Many of the computers, processes, and data stores illustrated in FIG. 12 are described above with reference to FIGS. 1, 7, and 9. For purposes of brevity, those descriptions will not be repeated here, but each of the computers, processes, and data stores of FIGS. 1, 7, and 9 included in FIG. 12 is configured to function with reference to FIG. 12 as described with reference to FIGS. 1, 7, and 9. However, the descriptions of any of these computers, processes, and data stores may be augmented or refined below.

As illustrated in FIG. 12, the virtual delivery agent 1204 is configured to enable the VW client application 1202 to access and utilize the virtual application 1206. In some examples of the configuration 1200, the privacy agent 118 is configured to monitor UI data representative of the UI of the virtual application 1206 for fingerprints indicative of private information and to transmit notifications where fingerprints are detected to the recording agent 116. The recording agent 116, in turn, is configured to generate session recordings in which private areas of the UI of the virtual application 1206 are obfuscated.

The configuration 1200 is but one example of many potential configurations that can be used to implement the system 100. As such, the examples disclosed herein are not limited to the particular configuration 1200 and other configurations are considered to fall within the scope of this disclosure.

Figure 13:
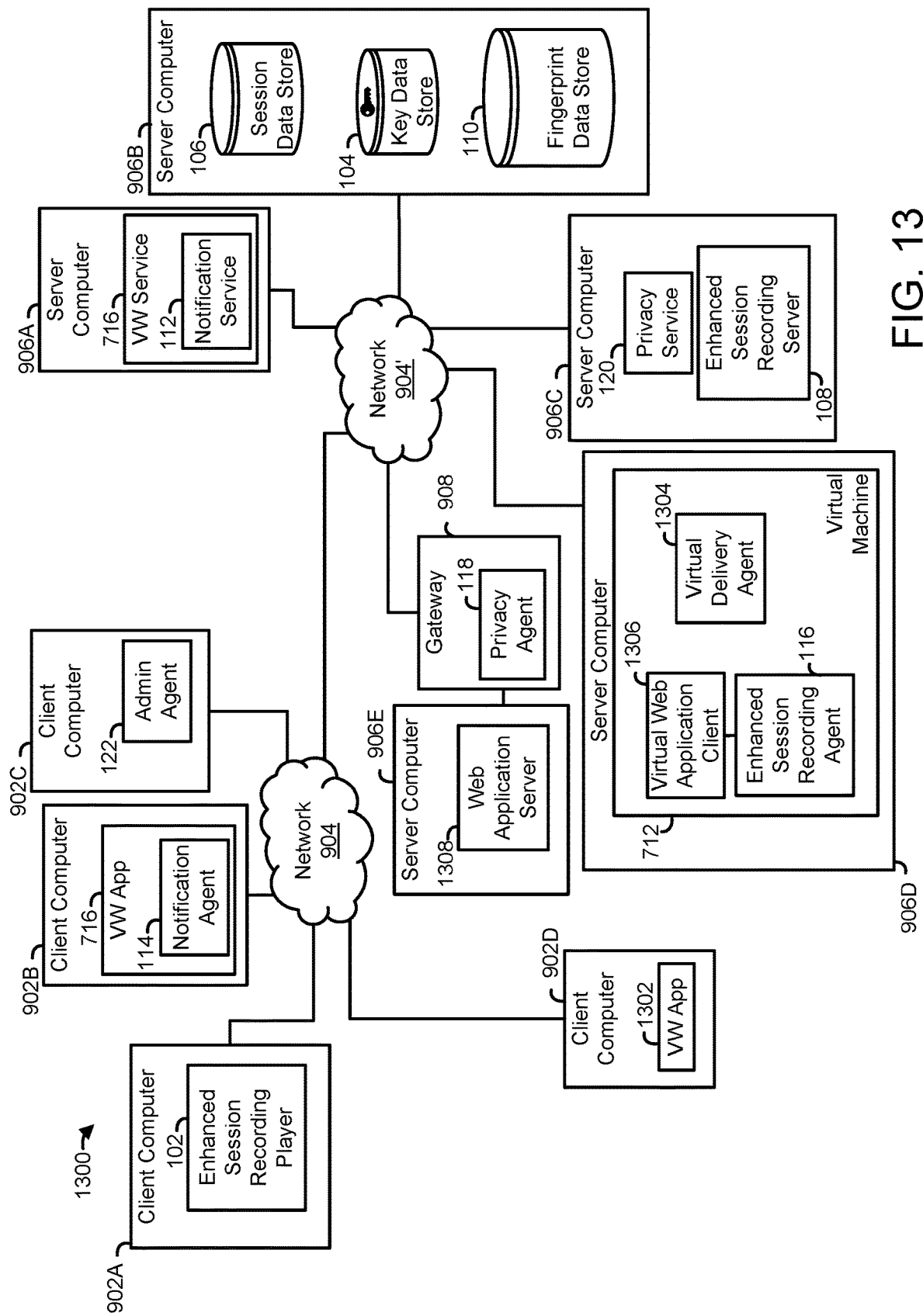
FIG. 13 is a block diagram of the PP system of FIG. 1 as implemented by a configuration of computing devices to protect private information transmitted to a monitored application via a gateway in accordance with an example of the present disclosure.

FIG. 13 illustrates a privacy protection system (e.g., the system 100 of FIG. 1) configured for operation within a distributed computing platform (e.g. the network environment 901 of FIG. 9) that supports virtual applications. As shown in FIG. 13, the configuration 1300 includes the client computers 902A-902D, the server computers 906A-906E, and the gateway computer 908 of FIG. 9. Within the configuration 1300, the computer systems 902A-902D, 906A-906E, and 908 are communicatively coupled to one another and exchange data via a network (e.g., the networks 904 and/or 904' of FIG. 9).

As shown in FIG. 13, the client 902A is configured to host the session player 102 of FIG. 1. The client 902B is configured to host the notification agent 114 of FIG. 1 within the VW client application 716A of FIG. 7. The client 902C is configured to host the administrative agent 122 of FIG. 1 within the VW client application 716B of FIG. 7. The client 902D is configured to host a VW client application 1302. The server 906A is configured to host the notification service 112 of FIG. 1 within the VW service 714 of FIG. 7. The server 906B is configured to host the key data store 104, the session data store 106, and the fingerprint data store 110 of FIG. 1. The server 906C is configured to host the privacy service 120 and the session recording server 108 of FIG. 1. The server 906D is configured to host the virtual machine 712 of FIG. 7, the recording agent 116 of FIG. 1, a virtual web application 1306, and a virtual delivery agent 1304. The server 906E is configured to host a web application server 1308. The gateway computer 908 is configured to host the privacy agent 118.

Many of the computers, processes, and data stores illustrated in FIG. 13 are described above with reference to FIGS. 1, 7, and 9. For purposes of brevity, those descriptions will not be repeated here, but each of the computers, processes, and data stores of FIGS. 1, 7, and 9 included in FIG. 13 is configured to function with reference to FIG. 13 as described with reference to FIGS. 1, 7, and 9. However, the descriptions of any of these computers, processes, and data stores may be augmented or refined below.

As illustrated in FIG. 13, the virtual delivery agent 1304 is configured to enable the VW client application 1302 to access and utilize the virtual web application 1306. In some examples of the configuration 1300, the privacy agent 118 is configured to monitor UI data representative of the UI of the virtual application 1306 (e.g. HTML) for fingerprints indicative of private information and to transmit notifications where fingerprints are detected to the recording agent 116. The recording agent 116, in turn, is configured to generate session recordings in which private areas of the UI of the virtual application 1306 are obfuscated.

The configuration 1300 is but one example of many potential configurations that can be used to implement the system 100. As such, the examples disclosed herein are not limited to the particular configuration 1300 and other configurations are considered to fall within the scope of this disclosure.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

The invention claimed is:

1. A computer system comprising:
a memory; and
at least one processor coupled to the memory and configured to
scan user interface (UI) data representative of a plurality of UI controls;
detect at least one portion of the UI data associated with private information, the at least one portion of UI data corresponding to at least one UI control of the plurality of UI controls;
generate an obfuscated session recording of interactive computing session of a user, the obfuscated session recording comprising a first session data comprising an obfuscated version of the at least one UI control and unobfuscated versions of other UI controls of the plurality of UI controls;

generate a clear session recording of the same interactive computing session of the user, the clear session recording comprising a second session data comprising an unobfuscated version of the at least one UI control;

encrypt the second session data to generate encrypted session data;

store the encrypted session data in association with the first session data;

receive, from a session player, a request to review the first session data;

responsive to receipt of the request to review the first session data, transmit, to the session player, the first session data;

receive, from the session player, a request to clarify the obfuscated version of the at least one UI control;

responsive to receipt of the request to clarify the obfuscated version of the at least one UI control, transmit, to the session player, the encrypted session data and a symmetric encryption key; and decrypt, via execution of the session player, the encrypted session data with the symmetric encryption key to render the second session data via the user interface.

2. The computer system of claim 1, wherein the at least one processor comprises a plurality of processors including one or more first processors and one or more second processors, the computer system comprises a gateway including the one or more first processors, and the one or more first processors are configured to scan the UI data.

3. The computer system of claim 1, wherein to detect the at least one portion comprises to compare the at least one portion to a set of UI data associated with private information.

4. The computer system of claim 3, wherein the set of UI data comprises one or more of application names, window titles, universal resource identifiers, portions of universal resource identifiers, hypertext markup language elements, and user interface automation elements.

5. The computer system of claim 1, wherein to detect the at least one portion comprises to detect one or more portions of the UI data that correspond to one or more UI controls selectable to cause the at least one processor to render the at least one UI control via a user interface.

6. The computer system of claim 1, wherein to record the first session data comprises to record the unobfuscated versions of other UI controls and to omit recording of the at least one UI control.

7. The computer system of claim 1, wherein to record the first session data comprises to record the unobfuscated versions of other UI controls and to record an unintelligible version of the at least one UI control.

8. The computer system of claim 1, wherein the at least one processor is further configured to encrypt the second session data using the symmetric encryption key.

9. The computer system of claim 8, wherein the at least one processor is further configured to store the symmetric encryption key in association with the encrypted session data.

10. The computer system of claim 1, wherein the at least one processor is further configured to:

transmit, to a notification agent in response to reception of the request to clarify, a request to authorize rendering of the second session data; and receive, from the notification agent, a response to the request to clarify including an indication that the request to clarify is granted.

11. The computer system of claim 10, wherein the notification agent is associated with a designated user.

12. A method of protecting private information using a computer system, the method comprising:

scanning user interface (UI) data representative of a plurality of UI controls;

detecting at least one portion of the UI data associated with private information, the at least one portion of UI data corresponding to at least one UI control of the plurality of UI controls;

generating an obfuscated session recording of an interactive computing session of a user, the obfuscated session recording comprising a first session data comprising an obfuscated version of the at least one UI control and unobfuscated versions of other UI controls of the plurality of UI controls;

generating a clear session recording of the same interactive computing session of the user, the clear session recording comprising a second session data comprising an unobfuscated version of the at least one UI control;

encrypting the second session data to generate encrypted session data;

storing the encrypted session data in association with the first session data;

receiving, from a session player, a request to review the first session data;

responsive to receiving the request to review the first session data, transmitting, to the session player, the first session data;

receiving, from the session player, a request to clarify the obfuscated version of the at least one UI control;

responsive to receiving the request to clarify the obfuscated version of the at least one UI control, transmitting, to the session player, the encrypted session data and a symmetric encryption key; and decrypting, via execution of the session player, the encrypted session data with the symmetric encryption key to render the second session data via the user interface.

13. The method of claim 12, wherein detecting the at least one portion comprises detecting one or more portions of the UI data that correspond to one or more UI controls selectable to initiate rendering of the at least one UI control.

14. A non-transitory computer readable medium storing processor executable instructions to protect private information, the instructions comprising instructions to:

scan user interface (UI) data representative of a plurality of UI controls;

detect at least one portion of the UI data associated with private information, the at least one portion of UI data corresponding to at least one UI control of the plurality of UI controls;

generate an obfuscated session recording of an interactive computing session of a user, the obfuscated session recording comprising a first session data comprising an obfuscated version of the at least one UI control and unobfuscated versions of other UI controls of the plurality of UI controls;

generate a clear session recording of the same interactive computing session of the user, the clear session recording comprising a second session data comprising an unobfuscated version of the at least one UI control;

encrypt the second session data to generate encrypted session data;

store the encrypted session data in association with the first session data;

receive, from a session player, a request to review the first session data;

responsive to receipt of the request to review the first session data, transmit, to the session player, the first session data;

receive, from the session player, a request to clarify the obfuscated version of the at least one UI control;

responsive to receipt of the request to clarify the obfuscated version of the at least one UI control, transmit, to the session player, the encrypted session data and a symmetric encryption key; and decrypt, via execution of the session player, the encrypted session data with the symmetric encryption key to render the second session data via the user interface.

* * * * *